(12) United States Patent
Komura et al.

(10) Patent No.: US 6,243,981 B1
(45) Date of Patent: Jun. 12, 2001

(54) INTER-LINE FISHING ROD

(75) Inventors: Yasuo Komura; Yoshinao Katoh, both of Tokyo; Tomoyoshi Tsurufuji, Saitama; Takashi Watanabe, Tokyo, all of (JP)

(73) Assignee: Daiwa Seiko, Tokyo (JP)

( * ) Notice: Subject to any disclaimer, the term of this patent is extended or adjusted under 35 U.S.C. 154(b) by 0 days.

(21) Appl. No.: 08/709,660

(22) Filed: Sep. 9, 1996

(30) Foreign Application Priority Data

| Sep. 7, 1995 | (JP) | ................................................... | 7-255510 |
| Oct. 27, 1995 | (JP) | ................................................... | 7-302337 |
| Dec. 20, 1995 | (JP) | ................................................... | 7-349282 |
| Apr. 5, 1996 | (JP) | ................................................... | 8-110273 |

(51) Int. Cl.[7] .................................................. A01K 87/04
(52) U.S. Cl. ............................................... 43/24; 43/18.1
(58) Field of Search ........................................ 43/18.1, 24

(56) References Cited

U.S. PATENT DOCUMENTS

| 2,777,239 | * | 1/1957 | Cushman | ................................... | 43/24 |
| 3,513,582 | * | 5/1970 | Carabasse | ............................... | 43/24 |
| 5,704,157 | * | 1/1998 | Utsuno | ..................................... | 43/24 |

FOREIGN PATENT DOCUMENTS

| 249360 | * | 8/1963 | (AU) | ....................................... | 43/24 |
| 2641269 | * | 3/1978 | (DE) | ....................................... | 43/24 |
| 0641513 |   | 3/1995 | (EP) . |
| 0712572 |   | 5/1996 | (EP) . |
| 2123967 |   | 9/1972 | (FR) . |
| 2560005 | * | 8/1985 | (FR) | ....................................... | 43/18.1 |
| 1-304836 |   | 12/1989 | (JP) . |
| 4-341133 |   | 11/1992 | (JP) . |
| 405276853 | * | 10/1993 | (JP) | ..................................... | 43/18.1 |
| 5-88259 |   | 12/1993 | (JP) . |
| 8-9840 | * | 1/1996 | (JP) | ..................................... | 43/18.1 |

* cited by examiner

*Primary Examiner*—Kurt Rowan
(74) *Attorney, Agent, or Firm*—Liniak, Berenato, Longacre & White

(57) ABSTRACT

An inter-line fishing rod including a joint portion which, when a spirally shaped fishing line guide is disposed in the interior of a rod pipe joined outside, prevents the fishing line from getting caught in the terminated portion of the spirally shaped fishing line guide, thereby allowing the fishing line to be inserted smoothly through the fishing rod. In the inter-line fishing rod including a joint portion 24 to be joined according to a normal joining method or a reverse joining method or to be connected integrally, a spirally shaped fishing line guide 22 is disposed in the interior of a rod pipe 12 situated outside the joint portion 24, the terminated portion 22E of the guide 22 is situated in the neighborhood of the joint portion 24, and a fishing line guide ring 26 having a smaller inside diameter D1 than the inside diameter D2 of the portion of the spirally shaped fishing line guide 22 existing in the terminated portion thereof is disposed at a position which exists not only in the end portion of a rod pipe 10 situated inside the joint portion 24 or in the neighborhood of such end portion but also in the rod pipe 10 or in the outside rod pipe 12.

4 Claims, 13 Drawing Sheets

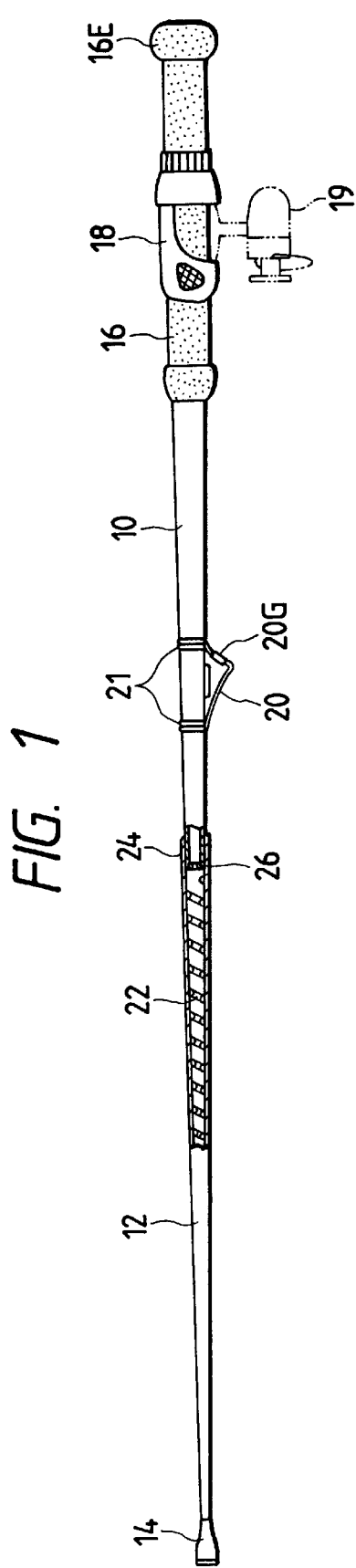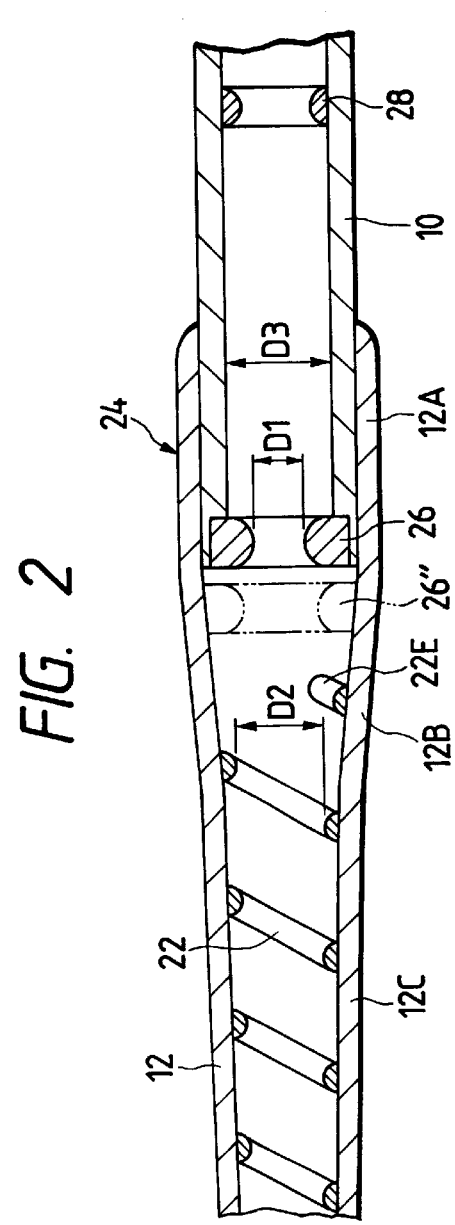

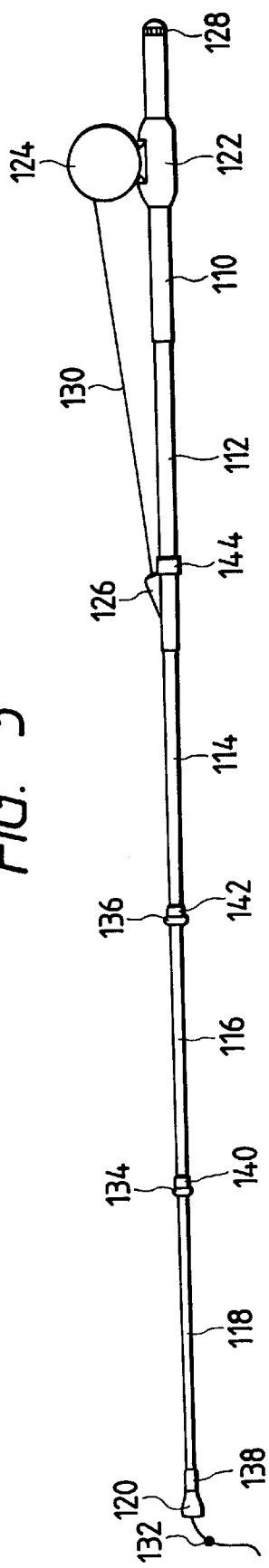
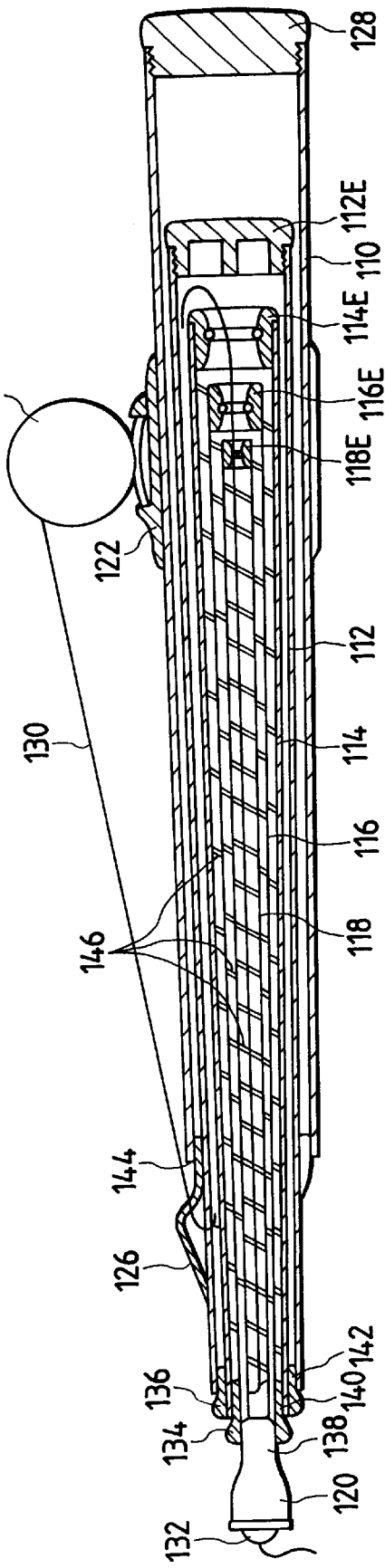
FIG. 3
FIG. 4

INTER-LINE FISHING ROD

BACKGROUND OF THE INVENTION

The present invention relates to an inter-line fishing rod and, in particular, to an improvement for a fishing line guide disposed in the interior of an inter-line fishing rod.

In an inter-line fishing rod, generally, a fishing line guide is provided in a rod pipe in order to prevent a fishing line passing through the interior of the rod pipe from touching the inner surface of the rod pipe to increase its resistance. For this purpose, in some cases, as the fishing line guide, there is used a fishing line guide which is formed to continue spirally.

In a conventional method for uniting the spirally shaped fishing line guide with the main body of the rod pipe, a carbon fiber bundle or the like used as the material of the spirally shaped fishing line guide is wound around a core metal, a prepreg for forming the rod pipe main body is then wound around the core metal from above the previously wound, spirally shaped fishing line guide and, after then, the thus wound assembly is heated under pressure so that the rod pipe main body and the fishing line guide can be formed integrally with each other. However, if the fishing line guide is wound such that it is terminated at the intermediate position of the rod pipe main body prepreg in the longitudinal direction thereof, then the terminated portion of the spirally shaped fishing line guide is likely to be raised, with the result that the rod pipe main body prepreg to be wound on the raised fishing line guide is caused to meander easily, which in turn leads to the poor product or poor fishing rod. To avoid this inconvenience, a time and labor taking processing must be carried out to thereby prevent the terminated portion of the fishing line guide from being raised. Besides this, generally, the spirally shaped fishing line guide is disposed over the whole length of the rod pipe main body and is formed integrally with the rod pipe main body and, after then, the unnecessary portions of the spirally shaped fishing line guide are scraped off or removed by reaming or by a similar operation.

However, the thus scraped end portion of the fishing line guide sometimes shows a sharp-angle state and thus, if the fishing line gets caught in such sharp-angle portion, then there is a danger that the fishing line can be damaged. Also, even when the end portion does not show such sharp-angle state, the existence of the end portion causes the fishing line to be easily caught in it when the fishing line is inserted through the rod pipe, which interrupts the smooth insertion of the fishing line, thereby decreasing the meaning of provision of the spirally shaped fishing line guide.

In an inter-line fishing rod including a joint portion, the spirally shaped fishing line guide cannot be provided on a rod pipe inner surface situated outside a joint portion formed between front and rear rod pipes for joining reasons. Therefore, the spirally shaped fishing line guide must be terminated in the neighborhood of the joint portion or far apart from the joint portion.

Accordingly, it is an object of the invention to provide an inter-line fishing rod including a joint portion which, when a spirally shaped fishing line guide is disposed in the interior of a rod pipe joined outside, prevents a fishing line from getting caught in the terminated portion of the spirally shaped fishing line guide, thereby allowing the fishing line to be inserted smoothly through the fishing rod.

In an inter-line fishing rod, from the viewpoint of the durability of the fishing rod, it is preferable to form the fishing line guide integral with the rod pipe element when the latter is formed by heating, since if fishing line guide is formed separately from a rod pipe element such as a rod pipe and the like and the fishing line guide is thereafter bonded and fixed to the rod pipe element, then the bonded portion is easy to peel off when the fishing rod is flexed repeatedly in fishing.

Conventionally, there is known a method for forming a fishing line guide integral with a rod pipe element in which, for example, tape is wound around a core metal in such a manner that the side portions of the tape are superimposed on each other, a fishing line guide is disposed in the recessed portion of a stepped portion having a depth equal to the thickness of the tape, a prepreg for forming the rod pipe element is wound around the core metal from above the tape and fishing line guide, and they are heated together to thereby form the rod pipe element and fishing line guide simultaneously and integrally with each other. However, this forming method suffers from restrictions due to the fact that the height of the fishing line guide depends on the thickness of the tape used. Here, when a fishing line guide having a small height is used, it may be generally expected that, if a large number of fishing line guides are arranged and the space between them is set narrow, then the fishing line is prevented from touching the inner surface of the rod pipe to thereby be able to reduce the resistance of the fishing line.

However, since the fishing line resistance is substantially in proportion to a value obtained by multiplying the contact length of the fishing line in contact with one fishing line guide by the number of fishing line guides (that is, a value which can be obtained by adding together all of the contact lengths of the fishing line with the fishing line guides), in order to reduce the fishing line resistance as much as possible, it is not sufficient simply to prevent the fishing line from touching the inner surface of the rod pipe and it is necessary to improve the contour shape of the fishing line guide.

It is therefore another object of the invention to provide an inter-line fishing rod in which a plurality of fishing line guides are formed integral with the inner surface of a rod pipe main body or one or more rod pipe members to be inserted into the rod pipe main body, characterized in that the resistance of the fishing line can be reduced as much as possible.

In Japanese Patent Publication No. 4-341133 of Heisei, there is disclosed a fishing rod in which a fishing line guide ring is formed of a single fiber strip having a high wear resistance on the inside surface of a rod pipe main body in such a manner that the fishing line guide ring projects out inwardly of the inner peripheral surface of the rod pipe main body.

In the above-mentioned conventional fishing rod disclosed by '133 publication, however, if the fishing rod is flexed greatly because fish catches the hook thereof, then the flexed or deformed fishing rod causes the interface between the fishing line guide ring and rod pipe main body to peel off easily. Also, if fish is caught and thus a fishing line inserted inside the rod pipe is taken up and pulled in such a manner that the fishing line is in strong contact with the fishing line guide ring projecting inwardly of the rod pipe main body, then there is produced a force to pull the fishing line guide ring from the rod pipe main body to thereby cause the interface between them to peel off, which results in the possibility that the fishing line guide ring can be damaged or the rod pipe main body can be broken in and around the neighboring portions of the fishing line guide ring.

In view of the above, it is yet another object of the invention to provide a fishing rod in which a fishing line guide is strongly united with the inside surface of a rod pipe main body.

In Japanese Patent Publication No. 4-341133 of Heisei, as described above, there is disclosed an inter-line fishing rod in which a fishing line guide ring (a fishing line guide element) formed of a single fiber is formed integral with the inner peripheral surface of a rod pipe. Also, in Japanese Patent Publication No. 5-88259 of Heisei, there is disclosed a fishing rod in which resin tape is spirally wound around a core metal, prepreg forming a rod pipe is further wound around the core metal from above the resin tape, and a spirally projecting portion (a fishing line guide element) is formed integrally and simultaneously with a tubular element such as the rod pipe or the like by use of the present prepreg.

Generally, to form the guide element integral with the inner surface of the rod pipe, the prepreg is wound around the outside of the core metal and the thus produced assembly is heated while applying pressure to it by means of fastening tape. However, in the former '133 publication, due to the presence of the guide element, the fibers of the rod pipe in the axial direction thereof are caused to meander and the fluid flow of the resin of the prepreg becomes uneven; and, on the other hand, in the latter '259 publication, due to the existence of the resin tape, similarly, the fibers of the rod pipe in the axial direction thereof are caused to meander and the fluid flow of the resin of the prepreg becomes uneven. As a result of this, the strength of the rod pipe is lowered so that the rod pipe is easy to break.

Also, the guide element to be formed integral with the inner surface of the rod pipe has a great effect on the strength of the rod pipe when the rod pipe is flexed, and stresses are generated concentratedly in the rod pipe according to the shape, structure, material and the like of the guide element, which raises a possibility that the rod pipe can be broken during fishing. That is, it is found that the above-mentioned conventional rod pipes give insufficient consideration to the guide element and the neighboring portion of the guide element.

Accordingly, it is further another object of the invention to provide an inter-line fishing rod which prevents the lowering of the strength of a rod pipe including a guide element formed integrally with and projecting inwardly from the inside of the rod pipe and, in particular, prevents the lowering of the strength of the portion of the rod pipe in the neighborhood of the guide element.

SUMMARY OF THE INVENTION

According to the invention, there is provided an inter-line fishing rod including a joint portion to be joined removably according to a normal joining method or a reverse joining method or to be connected integrally, in which a spirally shaped fishing line guide is disposed in the interior of a rod pipe situated outside the above-mentioned joint portion, the terminated portion of the present guide exists in the neighborhood of the joint portion, and a fishing line guide ring having a smaller inside diameter than the inside diameter of the portion of the spirally shaped fishing line guide in the neighborhood of the terminated portion thereof is disposed at a position which is situated not only in or adjacently to the end portion of a rod pipe situated inside the joint portion but also in the inside rod pipe or in the above-mentioned outside rod pipe.

In the rod pipe situated outside the joint portion, the spirally shaped fishing line guide must be formed in other areas than the joint portion area. Therefore, the terminated portion of the guide must be formed in the inner portion of the rod pipe to prevent the fishing line from getting caught in the terminated portion. In view of this, the fishing line guide ring is disposed in the end portion of the rod pipe situated inside the joint portion or in the neighborhood of the present end portion, the inside diameter of the fishing line guide ring is set smaller than the inside diameter of the spirally shaped fishing line guide in the neighborhood of the terminated portion thereof, and the spirally shaped fishing line guide is formed in such a manner that it is terminated in the neighborhood of the joint portion. Due to this, the fishing line to be inserted, when it passes through the rod pipe, is tightened or forced radially inwardly by the fishing line guide ring having a small inside diameter and is thus prevented from touching the terminated portion of the spirally shaped fishing line guide, so that the fishing line can be inserted smoothly through the rod pipe.

According to the invention, there is provided an inter-line fishing rod, comprising a rod pipe element, i.e., a rod pipe main body or a rod pipe member to be removably inserted into the rod pipe main body, and a large number of fishing line guides respectively formed integrally with and projecting inwardly from the inner surface of the rod pipe element, wherein at least the apex and its neighboring portion of each of the fishing line guides are contained in the range of an arc having a radius consisting of the projecting height of the fishing line guide from the inner surface of the rod pipe element and a center consisting of an intersecting point at which a line passing through the apex of the fishing line guide and perpendicular to the rod pipe element inner surface intersects with the rod pipe element inner surface.

Here, referring to the plurality of fishing line guides, even when a spirally shaped fishing line guide consisting of a single spiral strip is used, if the number of the spiral windings of the guide is two or more, then it can be considered well that the spirally shaped fishing line guide includes a plurality of fishing line guides. This applies similarly to other inter-line fishing rods of the invention as well.

Also, there is provided an inter-line fishing rod, comprising a rod pipe element, i.e., a rod pipe main body or a rod pipe member to be removably inserted into the rod pipe main body, and a large number of saw-tooth fishing line guides respectively formed integrally with and projecting inwardly from the inner surface of the rod pipe element, wherein, at points where a line having a height one-half the projecting height of the fishing ling guide from the rod pipe element inner surface intersects with right and left contour shape lines, on the shorter line side, there is drawn a first line perpendicular to the rod pipe element inner surface and passing through the point and, on the longer line side, there is drawn a second line touching the fishing line guide at the the other point, and the apex and its neighboring portion of the fishing line guide are situated outside a circle inscribed in a right triangle defined by the first and second lines and the rod pipe element inner surface line. In a tangent, i.e., the second line, on the long line side, even if the point of contact thereof includes minute uneven portions, the tangent is drawn on the assumption that the shape of the fishing line guide is equivalent to the saw-tooth shape used as a basic shape.

Since at least the apex and its neighboring portion of the fishing line guide are contained in the range of an arc having a radius consisting of the projecting height of the fishing line guide from the inner surface of the rod pipe element and a center consisting of an intersecting point at which a line passing through the apex of the fishing line guide intersects with the inner surface of the rod pipe element, the apex and its neighboring portion of the fishing line guide show an acutely projecting shape when compared with the shape of the above-mentioned arc. For this reason, the contact length of the fishing line in contact with the fishing line guide is shorter when compared with the fishing line guide the top portion of which shows the above-mentioned arc shape, and the resistance of the fishing line is reduced accordingly.

Because the apex and its neighboring portion of the fishing line guide show a more acutely projecting shape when compared with the circular shape inscribed in the above-mentioned right triangle, the contact length of the fishing line with the fishing line guide is shorter when compared with a structure in which the apex portion of the fishing line guide shows the above circular shape, and thus the resistance of the fishing line is reduced accordingly.

According to the invention, there is provided a fishing rod in which a fishing line guide is formed integrally with and projectingly from the inside surface of a rod pipe main body formed by winding prepreg made of reinforced fibers impregnated with synthetic resin, wherein a connecting member is so interposed between the rod pipe main body and fishing line guide as to extend over both of them and includes a component having a higher strength than synthetic resin which becomes fluid when it is heated.

That is, according to the invention, since there is provided the connecting member including a higher strength than the synthetic resin which can become fluid when it is heated, the connection of the fishing line guide with respect to the rod pipe main body can be strengthened as a whole.

According to the present invention, there is provided an inter-line fishing rod including a guide element formed integrally with and projecting inwardly from the inside of a rod pipe made of synthetic resin as a matrix reinforced by reinforcing fibers, in which the guide element is a spirally continuing guide or includes a plurality of annular guides arranged in the longitudinal direction of the rod pipe, and the rod pipe includes a reinforcing layer formed integral with the inner surface of the rod pipe, the reinforcing layer is so formed as to extend from the longitudinal end portion of the guide element toward the end portion of the rod pipe, the reinforcing layer, in the neighborhood of the longitudinal end portion of the guide element, has a thickness substantially the same as the height of the end portion of the guide element.

According to the present invention, there is provided an inter-line fishing rod including a guide element formed integrally with and projecting inwardly from the inside of a rod pipe made of synthetic resin as a matrix reinforced by reinforcing fibers, in which, between the main body of the rod pipe and the guide element, there is provided an area in which a reinforcing member having a larger width than the width of the guide element is disposed.

Generally, if a guide having a spiral shape or the like is terminated at the intermediate position of the rod pipe, when the rod pipe is flexed, the rod pipe is easy to break in the boundary area between the rod pipe area having no such guide arranged and the rod pipe area having such guide arranged. Also, according to a method for forming a projecting guide integrally with the rod pipe, since the prepreg of the rod pipe main body is wound around from above the guide, the prepreg of the rod pipe main body can meander or the fluid flow of the resin becomes uneven in a stepped portion provided at the terminated position of the guide, which results in the lowered strength of the rod pipe. Especially, the meandering of the fibers of the rod pipe in the axial direction thereof has a great influence on the strength of the rod pipe. In view of this, in order not only to reinforce the boundary area but also to prevent the prepreg of the rod pipe main body from meandering when the rod pipe and guide are formed integrally with each other, a reinforcing layer is formed integral with the inner surface of the rod pipe, while the reinforcing layer extends from the end portion of the guide element toward the end portion of the rod pipe and, in the portion thereof adjacent to the guide element, has a thickness substantially the same (on the order of 85–105%) as the height of the guide element. The present reinforcing layer includes not only a flexible member such as the buffer portion but also a member having high rigidity.

Since, between the main body of the rod pipe and the guide element, there is interposed a reinforcing member which has a greater width than the width of the guide element, the rod pipe is reinforced with respect to the concentrated stresses in the portion of the rod pipe existing in the periphery of the guide element caused by the integral formation of the guide element with the rod pipe, which results in the flexural strength of the rod pipe. The reinforcing member is mainly a sheet material such as carbon tape, a glass scrim sheet, a synthetic resin film or the like, or stringy synthetic resin, or a natural material such as a cotton yarn, paper or the like.

BRIEF DESCRIPTION OF THE DRAWINGS

FIG. 1 is a partially broken side view of a first embodiment of an inter-line fishing rod including a joint portion according to the invention.

FIG. 2 is a grossly enlarged longitudinal section view of the main portions of the embodiment shown in FIG. 1.

FIG. 3 is a side view of a second embodiment of an inter-line fishing rod, showing a state in which the fishing rod is swung out.

FIG. 4 is a longitudinal section view of the fishing rod shown in FIG. 3, showing a storage state thereof.

DETAILED DESCRIPTION OF THE PREFERRED EMBODIMENTS

Figure 5:
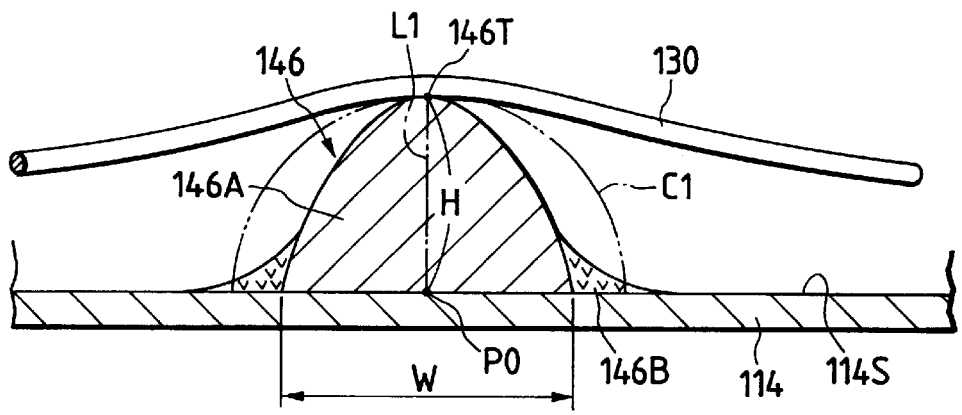
FIG. 5 is an enlarged cross section view of a fishing line guide employed in the fishing rod shown in FIG. 3.

Now, description will be given below in more detail of embodiments of an inter-line fishing rod according to the invention with reference to the accompanying drawings.

FIG. 1 is a partially broken side view of a joint-type removable inter-line fishing rod belonging to an inter-line fishing rod including a joint portion according to the invention, and FIG. 2 is a grossly enlarged longitudinal section view of the main portions of the fishing rod shown in FIG. 1. In the present fishing rod, a top rod 12 is joined to the leading end portion of a base rod 10 according to a reverse joining method, thereby forming a joint portion 24. Here, a reverse joining method means that a tipend side rod pipe is joined to the outside of a butt end side rod pipe. The joint portion 24 has a taper of the order of 6/1000. The base and top rods 10 and 12, namely, the rod pipes thereof, in the present embodiment, are respectively formed of a fiber reinforced prepreg which includes carbon fibers as the main components of reinforcing fibers. Also, a top guide 14 is mounted on the leading end of the top rod 12. Further, a grip 16 with cork mounted on the surface thereof is provided in the rear portion of the base rod 10, while a reel seat 18 is mounted on the grip 16. Moreover, a fishing line introduction portion 20 is provided in the front portion of the base rod 10 and, in the present embodiment, a frame member including a fishing line guide ring 20G is disposed in such a manner that it covers the upper two-side portions of a hole formed in the base rod 10, while the frame member is fixed by winding a thread member 21 therearound.

In the interior of the top rod 12, a spirally shaped fishing line guide 22 is formed integrally with the rod pipe main body of the top rod 22. In the illustrated embodiment, the spirally shaped fishing line guide 22 is formed of a fiber reinforced prepreg composed of a carbon fiber bundle impregnated with epoxy resin. However, this is not limitative but the guide 22 may be formed of other material. Also, the guide 22 may not be formed by heating integrally with the rod pipe main body but, after they are formed separately, they may be fixed to each other. Further, the spirally shaped fishing line guide may be so formed as to extend up to the leading end of the top rod 12 or may be terminated at the intermediate position of the top rod 12.

In FIG. 2 which shows the portions of the fishing rod situated before and behind the joint portion 24, the leading end portion of the base rod 10 is formed in such a stepped shape that the inside diameter thereof is increased, while a fishing line guide ring 26 formed of hard material such as ceramics or the like is mounted in the stepped portion. On the other hand, the top rod 12 joined outside the joint portion 24 includes a joined area 12A having a large diameter, the area 12B of the top rod 12 existing forwardly of the joined area 12A decreases in diameter in a tapered manner, and the main body area 12C of the top rod 12 existing further forwardly of the area 12B decreases in diameter forwardly in a more gently tapered manner than the area 12B. Referring here again to the above-mentioned spirally shaped fishing line guide 22 formed in the interior of the top rod 12, it is arranged such that one end portion or terminated portion 22E thereof is situated in the neighborhood of the leading end of the base rod joined inside the joint portion 24, that is, in the neighborhood of the joint portion 24.

Now, the inside diameter D1 of the fishing line guide ring 26 is set smaller than the inside diameter D2 of the portion of the spirally shaped fishing line guide 22 existing adjacent to the terminated portion 22E of the guide 22. Therefore, after it is drawn out from a spinning reel 19 mounted on the reel seat 18, the fishing line passes swingingly through the fishing line guide ring 20G of the fishing line introduction portion 20 of the base rod 10 to be introduced into the interior of the base rod 10, then passes through the fishing line guide ring 28 situated forwardly of the guide ring 20G, next passes through the fishing line guide ring 26 having a smaller inside diameter in which the fishing line is forced to pass in the neighborhood of the central portion of the joint portion 24, and, after then, advances toward the spirally shaped fishing line guide 22 situated forwardly of the guide ring 26 and having a larger inside diameter.

In this movement, although the fishing line is regulated by the fishing line guide ring 26 in such a manner that it is situated in the neighborhood of the central portion of the joint portion 24, the fishing line is set free from such regulation after it has passed through the guide ring 26 having the inside diameter D1, so that the fishing line is going to spread out. However, the fishing line does not spread out suddenly but it spreads gradually and, therefore, while the fishing line is prevented from touching the spirally shaped fishing line guide terminated portion 22E situated in the neighborhood of the joint portion 24, the fishing line advances into the spirally shaped fishing line guide 22 having the larger inside diameter D2. That is, the fishing line advances smoothly in this manner and is released externally from the top guide 14 mounted on the leading end of the top rod.

Now, the fishing line guide ring 26 may be mounted at a position existing slightly backwardly of the leading end portion of the base rod 10, or may be mounted at a position 26" of the top rod 12 existing slightly forwardly of the base rod leading end portion. Of course, the position of the spirally shaped fishing line guide terminated portion 22E is situated in front of the fishing line guide ring position 26". By the way, since the joint portion 24 is set according to a reverse joining method, the inside diameter D2 of the spirally shaped fishing line guide 22 can be set equal to or greater than the inside diameter D3 of the base rod 10. This prevents the possibility that the resistance of the fishing line can be increased due to the joining of the rod pipes in the joint portion 24.

In the top rod 12, as a connecting portion between the joined area 12A and main body area 12C, a stepped portion may also be used instead of the above-mentioned tapered portion 12B. Also, if the position of the fishing line introduction portion 20 is set a little further forwardly in the base rod 10, then there is eliminated the need for provision of the fishing line guide ring 28. Further, in the illustrated embodiment, in FIG. 2, the right side of the fishing rod is the rear side thereof and the left side of the fishing rod is the front side thereof. However, even if these sides of the fishing rod are reversed, the present invention holds similarly. That is, in this case, the joining method is a normal joining method, and the front area 12A of the rod pipe 12 with the spirally shaped fishing line guide 22 mounted therein (the main body of the rod pipe is reversely tapered with respect to the case shown in FIG. 2) is so formed as to have a large diameter, while the leading side rod pipe 10 is normally joined to the large-diameter front or joining area 12A. Also, the present invention can also apply to a fishing rod consisting of a single rod which is produced by joining together front and rear rod pipe elements according to a normal joining method or a reverse joining method.

In this case as well, referring to the swinging motion of the fishing line, since the inside diameter D1 of the fishing line guide ring 26 is smaller than the inside diameter D2 of the front portion of the spirally shaped fishing line guide 22, the fishing line cannot spread out fully up to the inside diameter D2 of the front portion of the spirally shaped fishing line guide but advances toward the smaller inside diameter D1 of the forwardly situated fishing line guide ring 26 while the diameter of the fishing line is being reduced. This prevents the fishing line from touching the front terminated portion 22E of the spirally shaped fishing line guide 22, so that the fishing line can pass through the rod pipe smoothly.

As can be clearly understood from the foregoing description, according to the invention, a fishing line guide ring is disposed in the end portion of a rod pipe situated inside a joint portion or in the neighborhood of such end portion, the inside diameter of the fishing line guide ring is set smaller than the inside diameter of the portion of a spirally shaped guide existing in the neighborhood of the terminated portion thereof, the spirally shaped fishing line guide is arranged such that it extends adjacently to the joint portion, and the terminated portion of the guide is situated in the neighborhood of the joint portion. Due to this structure, a fishing line to be inserted through the fishing rod passes through the rod pipe while it is tightened or forced inwardly by the fishing line guide ring having the smaller inside diameter, and is thereby prevented from touching the terminated portion of the spirally shaped fishing line guide, so that the fishing line can be inserted smoothly through the fishing rod.

FIG. 3 is a side view of another embodiment of an inter-line fishing rod according to the invention, showing a state thereof in which it is in use, while FIG. 4 is a longitudinal section view of the above embodiment when it is stored. In the present embodiment, a third middle rod 112 is joined to a base rod 110, a second middle rod 114 is joined to the third middle rod 112, a first middle rod 116 is joined to the second middle rod 114, and a top rod 118 is joined to the first middle rod 116 in a swing-out (or telescopic) manner. Also, a top guide 120 is threadedly engaged with the leading end of the top rod 118 in a removable manner. The base rod 110 includes a reel leg fixing device 122 to which a reel 124 is fixed, while a rod bottom part 128 is mounted on the rear end of the base rod 110. Also, the third middle rod 112 includes a fishing line introduction portion 126 in the front portion thereof, while a fishing line 130 is introduced through the reel 124 into the interior of the rod pipe and is then drawn out externally from the top guide 120. In the portion of the fishing line 130 existing outside the top guide 120, as shown in FIG. 2, there is mounted a ball-shaped line stop member 132 in order that part of the fishing line 130 can remain outside the top guide 120 when it is stored.

A hold portion 138 is formed in the rear portion of the top guide 120, outside the leading end of the first middle rod 16, there is formed a stopper portion 134 which includes a hold portion 140 in the rear portion thereof, in the leading end of the second middle rod 114, there is similarly formed a stopper portion 136 which includes a hold portion 142 in the rear portion thereof, and a hold portion 144 is formed in the rear portion of the fishing line introduction portion 126.

The top guide 120, stopper portions 134, 136, and fishing line introduction portion 126, when the rod pipes 118, 116, 114 and 112 in which they are respectively mounted or formed are stored into their adjoining larger diameter rod pipes 116, 114, 112 and 110, respectively serve as stoppers to prevent the rod pipes from being stored excessively in such a manner that the picking-out portions thereof used to pull out the rod pipes can be left unstored.

Also, on the respective rear ends of the rod pipes 118, 116, 114 and 112, there are removably mounted hollow plug members 118E, 116E, 114E and bottom plug 112E each of which includes a guide ring formed of ceramics. There is left a space between the hollow plug member 114E and the bottom plug 112E. That is, when the fishing rod is stored with the fishing line 130 inserted therein and the direction of the fishing line 130 is turned around the rear end of the second middle rod 114, the space makes it possible to insert the thus folded fishing line 130 freely. Therefore, when taking up the fishing line around the reel 124 with the respective rod pipes stored, the fishing line can be taken up freely unless the fishing rod is pointed downwardly but, if the fishing rod is pointed downwardly in error, then the respective rod pipes will fall down onto the ground or the like. The above-mentioned hold portions 138, 140, 142, and 144 are provided for prevention of such trouble and the rod pipes, in which the hold portions are respectively provided, are lightly pushed into and held by the respective inner surfaces of the leading ends of the adjoining larger diameter rod pipes in which they are to be stored. Due to this, in the storage state of the fishing rod, while the fishing line 130 is being taken up by the reel, the respective rod pipes are prevented from slipping off from the fishing rod, thereby being able to stabilize the fishing line taking-up operation.

In the interiors of the rod pipes 114, 116 and 118 respectively situated forwardly of the fishing line introduction portion 126, that is, over the whole portions thereof in the longitudinal direction of the fishing rod, there are formed a large number of fishing line guides 146 in such a manner that they project inwardly from the inner surfaces of the respective rod pipes. In fishing, thanks to the guidance of the large number of fishing line guides 146, the fishing line 130 can be inserted in such a manner that the insertion resistance thereof is reduced. However, the fishing rod may include such area in which no fishing line guide is provided. From now on, description will be given below of the second middle rod 114 as an example and the description can also apply similarly to other rod pipes 116 and 118.

Now, FIG. 5 is an enlarged sectional view of one of the large number of fishing line guides 146 formed by the above-mentioned spirally shaped guide. That is, in FIG. 5, the fishing line guide 146 is viewed from a direction to cross the spirally extending direction thereof. In FIG. 5, there is also shown an arc C1 which has as a center thereof a point of intersection P0 between a line L1 passing through the apex 146T of the fishing line guide 146 and intersecting at right angles with the inner surface 114S of the rod pipe main body 114 and also which has as a radius thereof a length H between the intersecting point P0 and the apex 146T. When the above-mentioned fishing line guide 146 is compared with the arc C1, the fishing line guide 146, except for a base portion 146B which provides a part of the lower portion of the fishing line guide 146, is contained within the arc C1. That is, this shows that the portion of the fishing line guide which exists near the apex thereof and can be contacted by the fishing line (which may be sometimes referred to as an apex portion hereinafter) projects.

Also, in FIG. 5, the contour shape of the fishing line guide 146 including the apex portion thereof is formed in a smoothly curved line. However, this is not limitative but the slanting side surfaces of the guide 146 may also be formed in a straight line. Also, a large number of fishing line guides 146 each having the above-mentioned structure are disposed with a small pitch. Therefore, although the fishing line 130 is inserted while it is in contact with the respective neighboring portions of the apexes 146T of the large number of fishing line guides 146, since the respective apex portions of the fishing line guides project as described above, that is, since the curvature of the fishing line guide 146 is larger than that of the arc C1, the contact length of the fishing line 130 is shorter when compared with a case in which the arc C1 is employed as the contour shape of the fishing line guide 146, thereby being able to reduce the resistance of the fishing line as a whole.

Also, the lower portion of the fishing line guide 146 including the base portion 146B may be contained within the above-mentioned arc C1. Further, in FIG. 5, the fishing line guide 146 is drawn in a right and left symmetric contour shape but the contour shape of the fishing line guide 146 may not be always symmetric perfectly, provided that the apex portion of the fishing line guide 146 is contained within the above-mentioned arc C1. These fishing line guides 146 can be formed integral with the rod pipe main body 114 using carbon fiber bundles or the like when the rod pipe main body 114 is formed. The base portions 146B are formed when the rod main body 114 and fishing line guides 146 are integrally formed by heating in such a manner that the impregnated resin of the rod pipe main body flows into the fishing line guides and is then hardened there. The main body portion 146A of the fishing line guide 146 including the apex portion is formed of prepreg made of a carbon fiber bundle impregnated with resin, while the apex portion of the fishing line guide 146 is preferably strong to wear. Therefore, preferably, the main body portion 146A of the fishing line guide 146 including the apex portion may be formed of prepreg which is made of reinforcing fibers impregnated with synthetic resin, while the reinforcing fibers include, besides the above-mentioned carbon fibers, ceramics fibers such as silicon carbide, alumina, boron, glass or the like, and metal fibers such as stainless steel, titanium or the like. Or, the main body portion of the fishing line guide including the apex portion may be formed by using water repellent resin such as fluorine or the like, lubricant resin, wear resisting resin or the like, as it is, or by processing such resin into fibers and then impregnating the fibers with epoxy resin or other similar resin. Alternatively, the fishing line guide 146, which is formed integral and simultaneous with the rod pipe main body 114 or connected integrally to the rod pipe main body 114, may be formed of prepreg made of reinforcing fibers impregnated with synthetic resin including fluorine resin or a mixture of fluorine resin and epoxy-group resin or the like. In place of fluorine resin, other water repellent synthetic resin may be used. Further, the reinforcing fibers may be dispensed with so that the fishing line guide 146 is formed only of fluorine resin or the mixture of fluorine resin and epoxy-group or other group resin.

A relationship between the width W of the main body portion 146A and the height (radius) H of the fishing line guide 146 may be set as H>W, preferably, the height may be greater, that is, H>1.3W.

Figure 6:
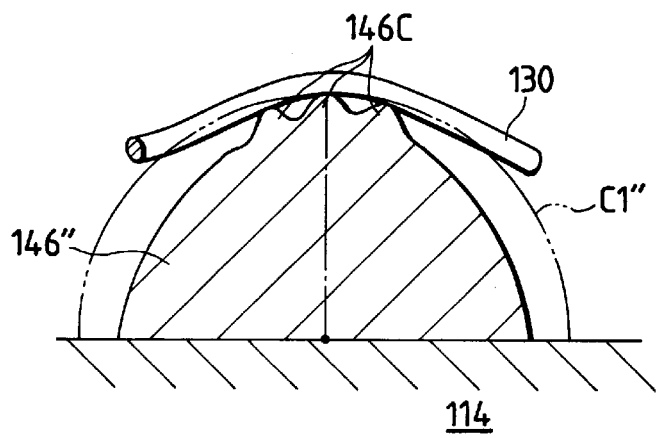
FIG. 6 is a section view of a modification of the fishing line guide shown in FIG. 5.

Also, in FIG. 6, there is shown a section view of a modification 146" of the fishing line guide, in which the apex portion of the fishing line guide is covered with a plurality of small projections 146C. The projections 146C are respectively formed in a smooth curved line and is also made of a fiber bundle or the like consisting of carbon fibers or the like. Since the fishing line 130 simply touches the apex portions of the projections, the contact length of the fishing line 130 is further shorter when compared with the embodiment shown in FIG. 5, so that the resistance of the fishing line 130 can be reduced accordingly.

In an arc C1" corresponding to the present modification in which the apex portion of the fishing line guide is covered with such uneven portion, the apex of the projection having the greatest height from the surface of the rod pipe main body is considered as the apex 146T in FIG. 5. In this modification, as shown in FIG. 6, all of the projections 146C are not always contained within the reference arc C1" but, in some cases, some of the projections may stick out of the arc C1". However, in this case as well, the contact length of the fishing line 130 can be shortened, so that the resistance of the fishing line 130 can be reduced.

Figure 7:
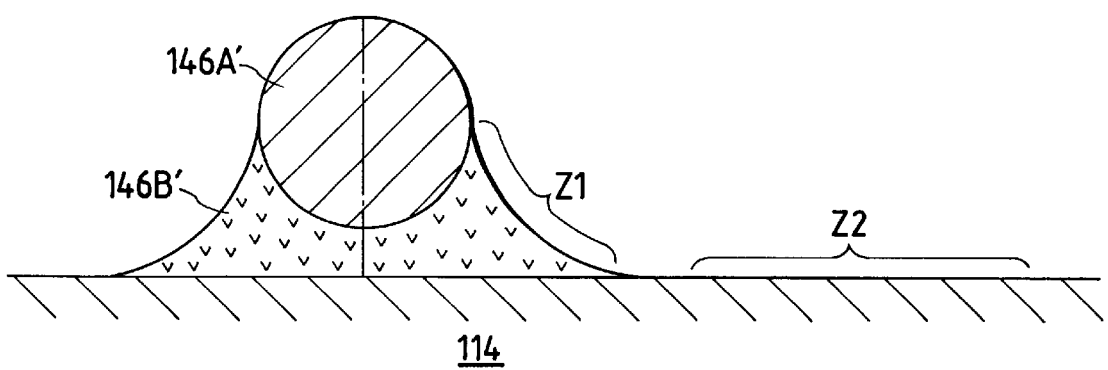
FIG. 7 is a section view of a further modification of the fishing line guide shown in FIG. 5.

Now, FIG. 7 shows a section view of another modification of the fishing line guide shown in FIG. 5, in which a main body portion 146A' is embedded in a base portion 146B' formed of synthetic resin or the like at a high position thereof. The main body portion 146A' may be formed as a single fiber strip which is formed of metal, ceramics, synthetic resin or the like. While the base portion 146B' may also be formed of other material than the synthetic resin, if it is formed of soft material, then it is possible to prevent stresses from being concentrated in the connecting portion of the fishing line guide with the rod pipe main body 114 when the fishing rod is flexed. Also, if the fishing line guide is structured such that the base portion thereof is broad in width and decreases gradually in thickness like the foot of Mt. Fuji, then the concentration of the stresses can be further reduced. The broad expanse of the foot may be increased and connected with the base portion of an adjoining fishing line guide. When fluorine is used as the soft material for the base portion, if fluorine particles are made to melt rather than they are mixed, then the fluorine is distributed over the entire base portion. For this reason, in a structure in which mutually adjoining base portions are arranged to continue with each other, when the fishing line is going to touch the inner surface of the rod pipe existing between the mutually adjoining fishing line guides, the resistance of the fishing line can be reduced efficiently.

If the entire surface of the fishing line guide or at least the surface of the lower portion of the fishing line guide, that is, the surface area Z1 of the base portion 146B' or the like is made highly repellent and an area Z2 such as the surface of the adjoining rod pipe main body (that is, the area between the mutually adjoining fishing line guides) is made hydrophilic to thereby enhance the water repellency on the fishing line guide side relatively, then it is possible to prevent water from attaching to the fishing line guide portion in the form of water drops as well as to decrease the possibility of the fishing line touching the water drops. Further, since the water drops fallen down from the fishing line guide spread in the area Z2 which is relatively low in water repellency, the fishing line is difficult to touch the water, so that the resistance of the fishing line can be reduced accordingly.

Figure 8A:
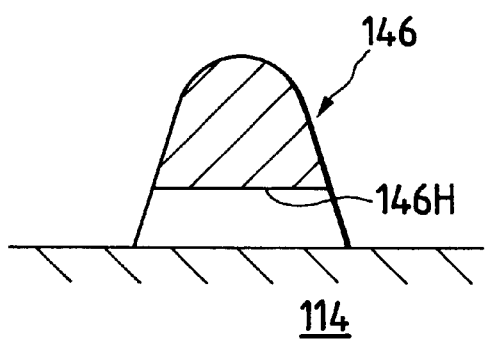
FIG. 8(*a*) and 8(*b*), each is a section view of a still further modification of the fishing line guide shown in FIG. 5.
Figure 8B:
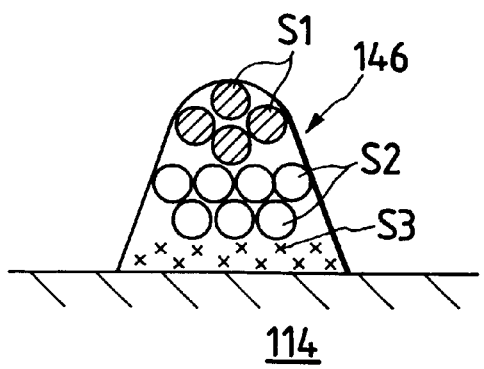

Now, FIGS. 8(a) and 8(b) shows a section view of a further modification of the fishing line guide shown in FIG. 5, while the present fishing line guide is light in weight. In particular, in FIG. 8(a), a through hole 146H is formed in the base portion of the fishing line guide 146 to thereby reduce the weight thereof and, at the same time, water drops are made to flow or move in the right and left direction (in the longitudinal direction of the rod pipe) in FIG. 8(a) and the water is drained at a given position. If a hollow portion (air collecting portion) is formed instead of the through hole, then only the weight reduction can be realized.

On the other hand, in FIG. 8(b), in the apex portion of the fishing line guide which can be touched by the fishing line, there is provided a mixed area S1 which consists of a combination of highly wear resisting silicon carbide fibers with hollow resin fibers (or hollow glass fibers), hollow fibers S2 are provided in the middle height portion of the fishing line guide, and foaming material S3 is mixed in the base portion of the fishing line guide, thereby being able to reduce the weight of the fishing line guide.

Figure 9:
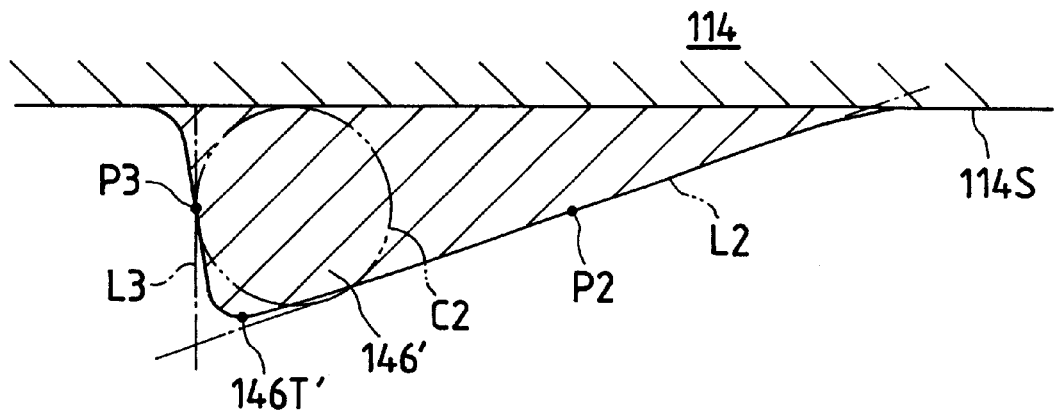
FIG. 9 is a cross section view of a fishing line guide employed in a third embodiment of the invention.

Now, FIG. 9 shows another embodiment of the section of the fishing line guide according to the invention. In particular, FIG. 9 shows a tooth-saw shaped fishing line guide with the right and left symmetry thereof collapsed greatly and also FIG. 9 is a transverse section view of a spirally continuing fishing line guide 146'. In manufacturing the fishing line guide having such shape, a thick tape is wound around a core metal in such a manner that the side portions of the tape are overlapped on each other, a thin sheet or the like is put on the thus wound tape in order to round the corners of the resultant stepped portions of the tape to thereby produce a smooth fishing line guide, material such as a carbon fiber bundle or the like for forming the fishing line guide is then wound on and around the thus formed assembly, a prepreg for forming a rod pipe main body is further wound on and around the above assembly, and the entire assembly is heated and fired so that the fishing line guide can be formed integrally with the rod pipe main body. The height of the fishing line guide 146', similarly to the previously described fishing line guide 146, is normally of the order of 0.5 mm.

In FIG. 9, points P2, P3 represent points at which a line having a length equivalent to one-half the height from the inner surface 114S of the rod pipe main body 114 intersects with the contour shape lines of the fishing line guide. The point P2 is the intersecting point of the line (slanting line) on the long side of the tooth-saw shape of the fishing line guide, while P3 is the intersecting point of the lines on the short side thereof. A tangent L2 is drawn at the point P2, a perpendicular L3 is drawn with respect to the inner surface 14S at the point P3, and the inner surface 114S, tangent L2 and perpendicular L3 are combined to obtain a right triangle. Here, let us assume a circle C2 which is inscribed in this right triangle.

The portion of the fishing line guide 146' adjoining the apex 146T' thereof, namely, the apex portion of the fishing line guide 146' exists outside the above-assumed circle C2. That is, the apex portion projects beyond the circle C2 and is larger in curvature than the circle C2.

Due to this, when the fishing line is inserted, the contact length of the fishing line with the fishing line guide 146' becomes shorter and thus the resistance of the fishing line can be reduced accordingly.

Figure 10:
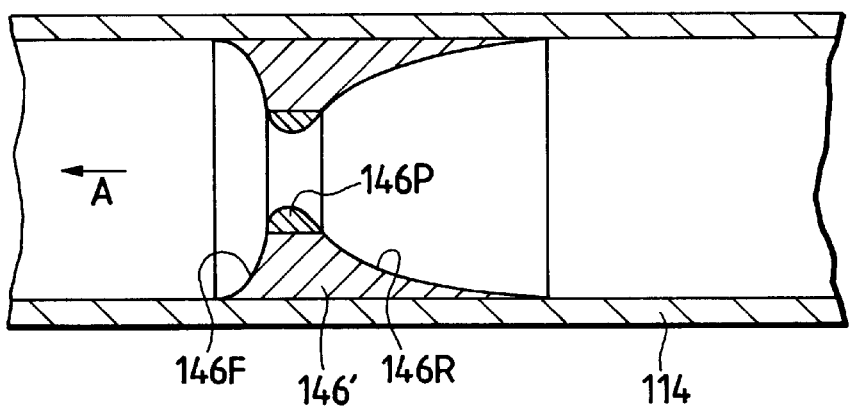
FIG. 10 is a section view of the fishing line guide shown in FIG. 9, showing the use state thereof.

Now, FIG. 10 shows an example of use of the fishing line guide 146' described in connection with FIG. 9, in which an A-direction leading portion is the leading portion of the rod pipe main body 114. The rear side of the fishing line guide 46' is formed in a gently slanting surface 146R, while the front side thereof is formed in a steeply slanting surface 146F. Due to this structure, conveniently, the fishing line guide 146' produces less resistance when the fishing line is fed out and, when the fishing line is taken up, the fishing line guide 146' operates to drain water drops attached to the fishing line. Since the gently slanting surface 146R is formed in a recessed shape, the contact length of the fishing line is shorter when compared with the straight surface shown in FIG. 9, so that the resistance of the fishing line can be reduced accordingly. Also, if the front-side steeply slanting surface 146F is made water repellent, then the water drops drained in the take-up operation are difficult to attach to the surface 146F and, in the following operations, the fishing line can be prevented from touching the drained water drops. Here, if the apex portion 146P to be contacted strongly by the fishing line is formed of wear resisting material such as ceramics or the like, then the durability of the apex portion 146P can be enhanced. By the way, although the illustrated fishing line guide 146' is formed in a ring shape, it may also be formed in a spiral shape.

Figure 11:
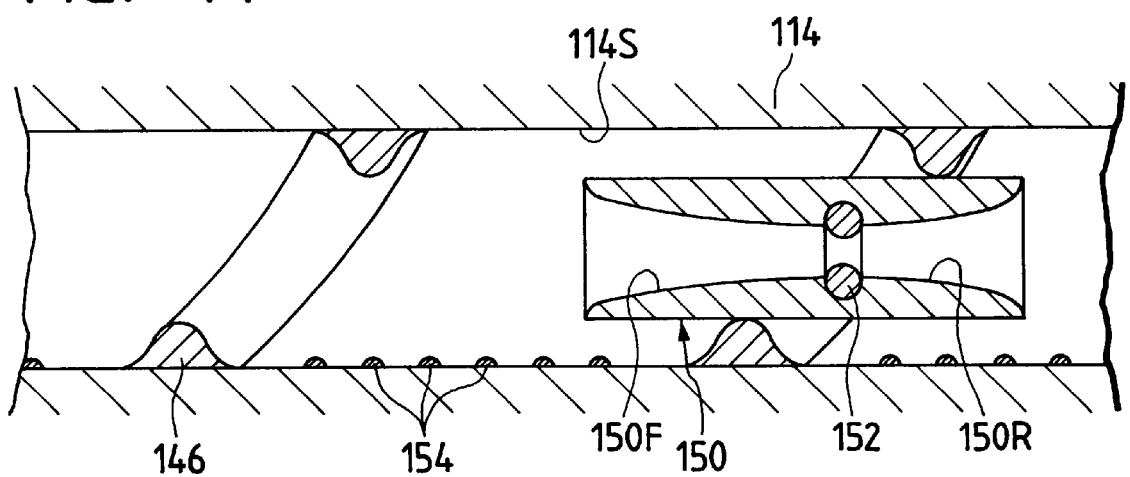
FIG. 11 is a section view of a fishing line guide employed in a fourth embodiment of the invention, showing an example of combined use of the fishing line guides.

As has been described so far, the inter-line fishing rod, in which a large number of fishing guides having section shapes shown in FIG. 5 and FIG. 9 are formed integral with the inner surface of the rod pipe main body or rod pipe members to be inserted into the rod pipe main body, is the basic embodiment according to the invention. However, this is not limitative but, as shown in FIG. 11, the above fishing line guides can also be combined with another type of fishing line guide. That is, on the inner surface of a fishing line insertion element 150 having a cylindrical outer shape, there is mounted a fishing line guide 152 formed of ceramics or the like, and the fishing line insertion element 150 including inner surfaces 150F and 150R respectively increasing in diameter forwardly and backwardly is inserted into the rod pipe main body 114. This structure operates in such a manner that the fishing line can be inserted through the central portion of the rod pipe main body 114.

The fishing line insertion elements 150 are disposed in places, a large number of fishing line guides 146 of the previously-mentioned type are interposed between the fishing line insertion elements 150, and the fishing line is received by the apex portions thereof so that it is prevented from touching the inner surface 114S of the rod pipe main body 114. As a result of this, the contact length of the fishing line can be reduced to thereby decrease the resistance of the fishing line as much as possible. However, if the pitch of the fishing line guide 146 is too large, then there is a possibility that the fishing line can touch the inner surface of the rod pipe main body 114 between the fishing line guides 146. To prevent an increase in the fishing line resistance in this case, in FIG. 11, there is also shown another means in which further smaller projections 154 are interposed by a proper number, that is, one or more between the fishing line guides 146 to thereby be able to reduce the contact surface of the fishing line with the inner surface of the rod pipe main body 114. The projection 154 should be lower in height than the fishing line guide 146, whereas the width of the projection 154 may be larger, or smaller, or substantially equal to that of the fishing line guide 146. Further, the projections 154 may be produced by connecting separate members with the rod pipe main body 114 as a united body, or may be produced by forming the inner surface 114S of the rod pipe main body 114 in a corrugated shape when the rod pipe main body 114 is formed by heating.

In this manner, if the guides are provided in three stages, then the resistance of the fishing line can be reduced effectively. Also, in FIG. 11, although the fishing line insertion element 150 is inserted through the fishing line guide 146, it may also be inserted through an area in which no fishing line guide exists in such a manner that its outer periphery is in contact with the inner surface 114S of the rod pipe main body 114. Further, this means can also apply similarly even when the before-mentioned fishing line guide 146' is used instead of the fishing line guide 146.

When the above-mentioned small projections 154 are not provided, the pitch of the fishing line guide 146 may be about 15–50 times the height of the fishing line guide 146, preferably, about 15–30 times.

The fishing line insertion element 150 having the small-diametered fishing line guide 152 may be fixed relative to the rod pipe main body 114. A large number of or a plurality of the fishing line insertion elements 150 may be disposed within the rod pipe main body 114. In this case, the interval between the adjacent fishing line insertion elements 150 is set larger than the interval of the fishing line guides 146.

In the above-embodiment, the fishing line guides 146 and the smaller projections 154 are made integral with the inner surface 114S of the rod pipe main body 114. For convenience in maintenance, the following arrangement is conceivable. That is, the combination of the fishing line guides 146 and smaller projections 154 or the combination of the fishing line guide 146, smaller projections 154 and fishing line insertion elements 150 is formed separately from the rod pipe main body 114 as a cartridge, and such combination is removably mounted in the interior of the rod pipe main body 114.

As described previously, if the base portion of the fishing line guide 146 (146') is covered with or formed of water repellent material such as silicone or the like so that the baas portion is higher in water repellency than the inner surface 114S of the rod pipe main body 114 between the respective fishing line guides, then the water drops are prevented from attaching to the peripheral portions of the fishing line guides and further the water drops are made to spread out thin on the rod pipe main body inner surface between the fishing line guides. As a result, the fishing line is prevented from touching the water drops, so that the resistance of the fishing line can be reduced. In addition, if the fishing line guide is positively made hydropholic, then water drops having a large height (water drops having a round shape) can be easily turned into low water films, which makes it difficult for the fishing line to touch water. This means also can reduce the resistance of the fishing line.

The spirally shaped fishing line guide may be a right spirally shaped one or a left spirally shaped one and, preferably, the direction of the spiral may be perpendicular to the winding direction of the fishing line. If the height of the fishing line guide is set such that the fishing line guide projects 0.3 mm or more from the inner surface of the rod pipe, then the fishing line is difficult to touch the rod pipe inner surface, which generally can reduce the resistance of the fishing line. Also, the maximum height of the fishing line guide, preferably, may be 20% or less of the inside diameter of the rod pipe for the purpose of easy cleaning and, for the purpose of easy production, it may be 1 mm or less. In production, for example, if tape is wound around a core metal in such a manner that the side portions thereof are overlapped on each other and the fishing line guides are formed in the recessed portions of the thus produced stepped portions each having a depth equivalent to the thickness of the tape, then the fishing line guides can be produced easily. For this reason, the height of the fishing line guide is limited to the thickness of the tape. That is, the height of the fishing line guide may be set, for example, in the range of 0.3–0.6 mm.

As the pitch of the fishing line guide decreases, the fishing line becomes difficult to touch the inner surface of the rod pipe. Therefore, in this sense, the pitch may be preferably set 30 mm or less, more preferably, 20 mm or less. However, if the pitch is set too small, then all fishing line guides continue with one another, which spoils the meaning of provision of the fishing line guides, causes the weight of the fishing rod to increase greatly and has a considerable influence on the flexural rigidity of the fishing rod. Therefore, the pitch of the fishing line guides may be set in the range of 5–20 mm. Further, since the inside diameter of the fishing rod becomes smaller as the fishing rod goes toward the top portion thereof, in order to make it difficult for the fishing line to touch the rod pipe inner surface, the pitch may be set smaller toward the top portion of the fishing rod. For this reason, as shown in FIG. 2, the pitch is set smaller in the order of the second middle rod 114, first middle rod 116, and top rod 118.

The ratio of (pitch/height), as described previously, is set in the range of 15–50, preferably, in the range of 15–30. Since the top portion of the fishing rod having a small inside diameter decreases in height, the pitch of the fishing line guides is set smaller according to such decrease in the height of the fishing rod. On the other hand, in the rear portion of the fishing rod having a large inside diameter, the height thereof can be set relatively large and the pitch can be set large according to the large height. That is, if the pitch is set too large with respect to the height, then the fishing line can touch the inner surface of the rod pipe so that the resistance of the fishing line can be increased; and, if the pitch is set too small, then the weight of the fishing rod is increased and the flexural rigidity of the fishing rod is influenced considerably. In view of this, for the above-mentioned ratio, there exists a proper range and the ratio is set in the above-mentioned range. In this range, even when the fishing line is twined slightly or has a line tendency, the fishing line is difficult to touch the rod pipe inner surface but is easy to be cared for. Also, it is easy to prevent the water drops from collecting between the fishing line guides. However, this is not limitative but, for example, the pitch of the fishing line guides may be set constant regardless of the inside diameters of the rod pipe and, in the top portion of the fishing rod, in order to secure a space for insertion of a fishing line, the height of the fishing line guide may be set low.

The inclination angle of the spirally shaped fishing line guide can be selected in a wide range extending from the circumferential direction (90 deg.) to an angle near the longitudinal direction of the fishing rod (on the order of 5 deg.). However, it is preferred to select an angle smaller than 45 deg., because such angle allows water to flow easily along the longitudinal direction of the fishing rod. Also, the spiral may be shaped intermittently, or a large number of ring-shaped fishing line guides may be disposed, or the ring or spiral may be broken in part in the circumferential direction thereof.

The above-mentioned embodiments can be used as an individual embodiment, while they may also be combined in part with each other to thereby provide an arbitrary structure.

In a structure in which a rod pipe member including a large number of inwardly projecting fishing line guides formed on the inner surface thereof is removably inserted into a fishing rod with an inserted fishing line, if the rod pipe member is considered as the rod pipe main body employed in the above-mentioned embodiments, the foregoing description can also apply similarly.

Further, in the above-mentioned embodiments, although description has been given of a case in which the fishing line guides are formed integral with the rod pipe element, it is also possible to apply the invention to a case in which the above-mentioned fishing line guides are formed separately and are mounted into the rod pipe element afterwards.

As can be clearly understood from the foregoing description, according to the invention, since the apex portion of the fishing line guide is formed in a projecting shape, the length of the fishing line to be in contact with the guide apex portion is short, so that the resistance of the fishing line can be reduced as much as possible.

Figure 12:
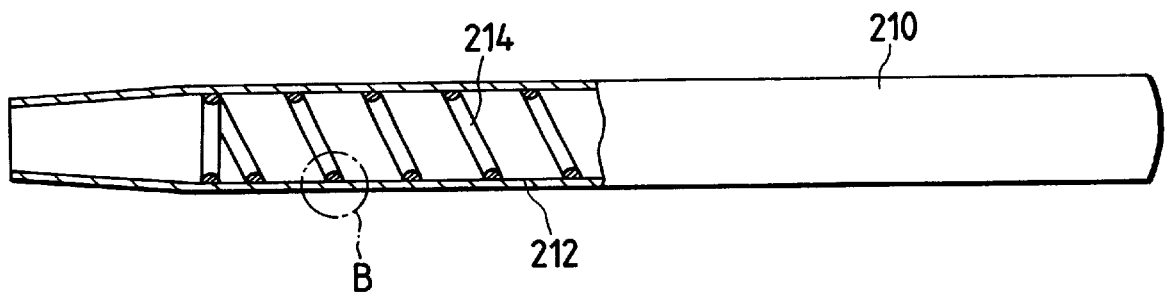
FIG. 12 is a partial section view of a rod pipe according to a fifth embodiment of the invention.

FIG. 12 shows the structure of another embodiment of a rod pipe 210 employed in a fishing rod according to the invention, in which a spirally shaped fishing line guide 214 is formed integrally on and projected inwardly from the inside surface of a rod pipe main body 212. The rod pipe main body 212 can be formed by winding and heating prepreg made of reinforced fibers such as carbon fibers or the like impregnated with synthetic resin such as epoxy resin or the like. Simultaneously with the formation of the rod pipe main body 212, the fishing line guide 214 is formed by heating integrally with the rod pipe main body 212.

Figure 13:
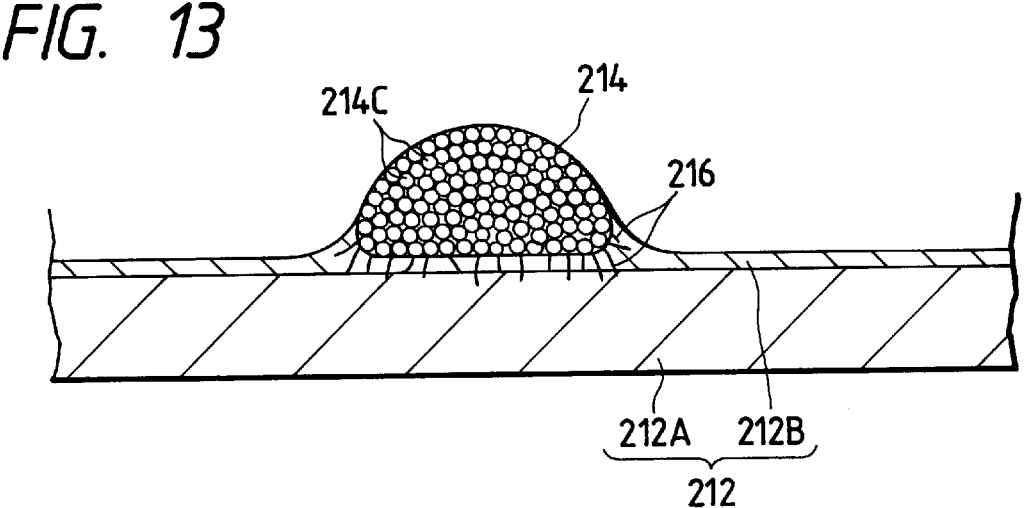
FIG. 13 is an enlarged view of a B portion shown in FIG. 12.
Figure 14:
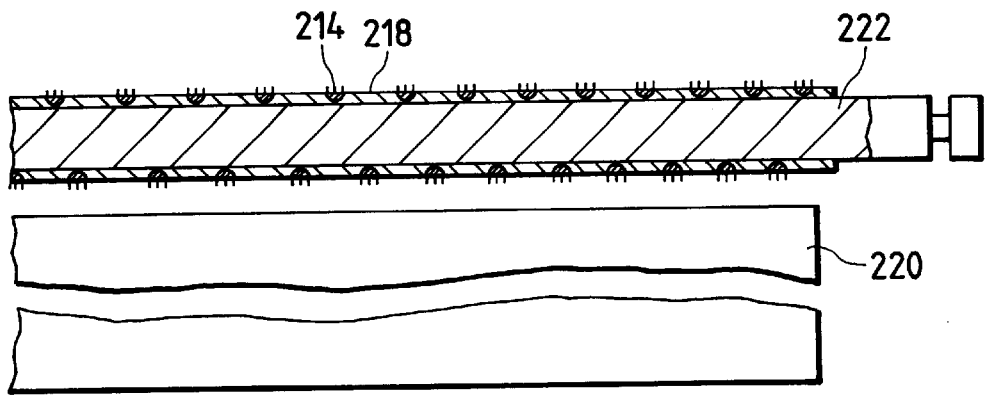
FIG. 14 is an explanatory view of a method for manufacturing the rod pipe shown in FIG. 12.

Now, FIG. 13 is enlarged view of a B portion shown in FIG. 12. The fishing line guide 214 consists of a carbon tow can be formed by bundling up a thousand to several scores of thousands of carbon fibers 214C and, preferably, the respective carbon fibers 214C are twined when the fishing line guide 214 is formed. On the other hand, the rod pipe main body 212 is composed of an area 212A in which the reinforced fibers and synthetic resin exist in combination, and a synthetic resin layer 212B which is arranged as the inner-most layer of the rod pipe main body 212. As shown in FIG. 14, a tape 218, which formed of heat resisting material such as polyethylene naphtalate (PEN), polyethylene terephtalate (PET), polypropylene (PP) or the like, is wound spirally around a core metal 222 with given spaces between the mutually adjoining spirals thereof and the above-mentioned fishing line guide 214 is then wound spirally around the core metal 222 along the above-mentioned given spaces; and, after then, if the outside surface of the fishing line guide 214 is rubbed with a rather hard brush, then the fibers can be made fluffy. Then, a prepreg sheet 220 is wound around on the above assembly and, while applying pressure to the above assembly by use of a fastening tape or the like, the assembly is heated to thereby be able to form the rod pipe main body 212 and the fishing line guide 214 simultaneously and integrally.

In this case, the fluffy carbon fibers 216 serving as the connecting member bite into the rod pipe main body 212, which makes it difficult for the fishing line guide 214 to peel off from the rod pipe main body 212. The fishing line guide 214 is formed in such a manner that it is in part embedded in the inner-most layer or synthetic resin layer 212B of the rod pipe main body 212, which is also effective in preventing the fishing line guide 214 from peeling off from the rod pipe main body 212. Also, it is not always necessary to fluff the fibers over the entire length of the spirally-shaped fishing line guide 214 but, even if the fibers are fluffed only in a portion of the guide 214 such as in an easily flexing position, an easily peeling-off portion or the like, there can be obtained a peel-off preventive effect.

Figure 15:
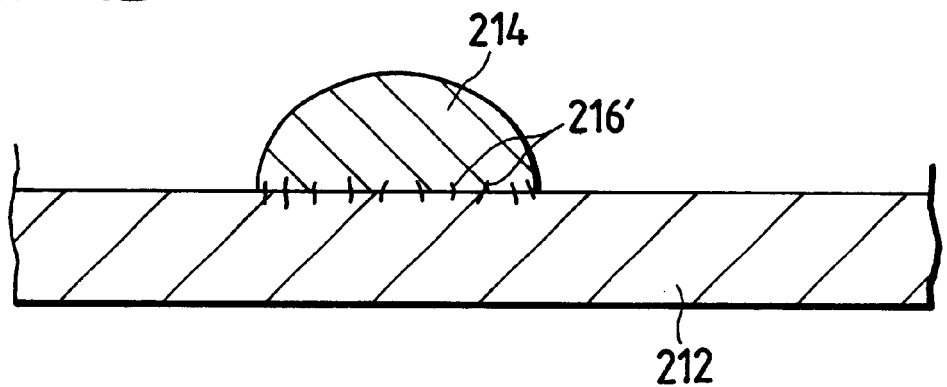
FIG. 15 is a partial view of a rod pipe according to a sixth embodiment of the invention.

Now, in FIG. 15, there is shown a typical view of another embodiment of a rod pipe according to the invention. In the present embodiment, instead of fluffing the fishing line guide 214 according to the fluffing method shown in FIG. 14, after the fishing line guide is wound around the core metal 222, thermosetting synthetic resin having the same adhesiveness as the material of the rod pipe main body 212 is applied onto the outside surface of the fishing line guide 214, and thorn-like elements such as whiskers or the like are sprinkled over the fishing line guide 214. It is preferable that the synthetic resin to be applied here is the same as the synthetic resin used for the rod pipe main body, but it is not always necessary that they are the same synthetic resin. In this manner, that is, by sprinkling the thorn-like elements 216' on the outside surface of the fishing line guide 214, winding the prepreg sheet on and around such fishing line guide 214, and heating them together, the thorn-like elements 216' serving as the connecting member can be formed over both the rod pipe main body 212 and fishing line guide 214, thereby being able to prevent the peel-off of the fishing line guide from the rod pipe main body.

Figure 16:
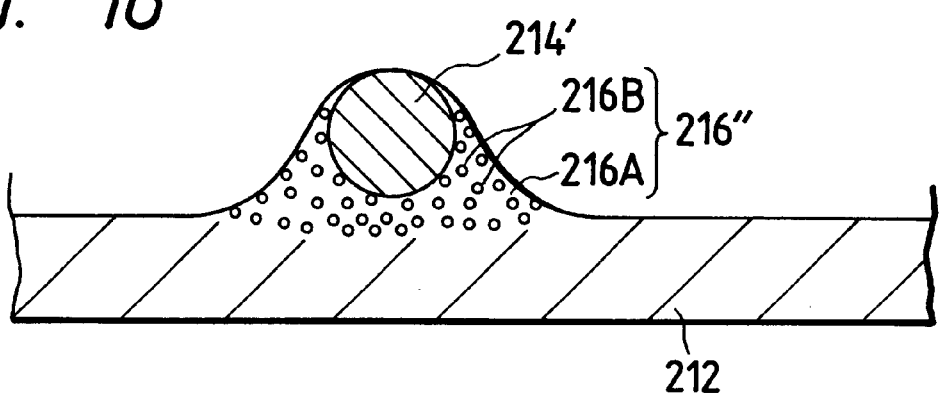
FIG. 16 is a partial view of a rod pipe according to a seventh embodiment of the invention.

Now, in FIG. 16, there is shown another embodiment of a rod pipe according to the invention. In this embodiment, a single fiber strip 214' is united with the rod pipe main body 212 by means of a connecting member made of synthetic resin 216A, which becomes fluid when heated, mixed with high-strength and high-adherence particles 216B formed of synthetic resin particles such as hollow glass beads, carbon particles, polyetherimide particles or the like. In this case, the particles 216B are mixed into the rod pipe main body 212 side as well. That is, the connecting member 216" is so arranged as to extend over both the fishing line guide side and rod pipe main body side without forming any clear interface between them. This makes it possible to prevent the fishing line guide 214 from peeling off from the rod pipe main body. It is preferable that the synthetic resin 216A is the same as the matrix synthetic resin used for the rod pipe main body 212, but it is not always necessary that they are the same.

Figure 17:
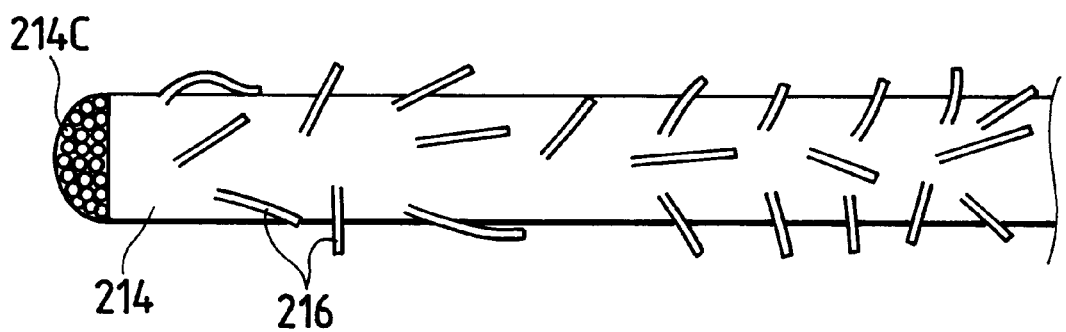
FIG. 17 is a view of an example of a fishing line guide employed in the invention before it is wound around a core metal.

Also, when the fibers are made fluffy as in the embodiment shown in FIG. 14, it is also possible that, as shown in FIG. 17, in the state of the carbon tow 214 before it is wound around the core metal, the carbon fibers 214C are previously made fluffy in part to turn out into fluffy fibers 216.

Figure 18:
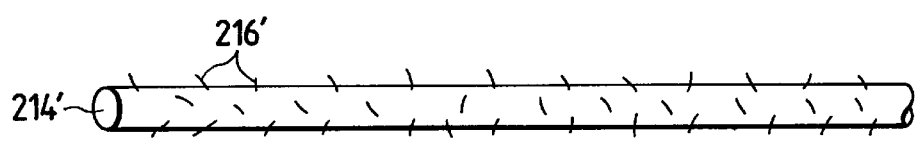
FIG. 18 is a view of another example of a fishing line guide.

Further, when the thorn-like elements are sprinkled as in the embodiment shown in FIG. 15, as shown in FIG. 18, the thorn-like elements 216' may be coated, planted or sprinkled on the carbon tow before it is wound around the core metal or on the single fiber strip 214', or the single fiber strip 214' itself may be previously made fluffy.

Figure 19:
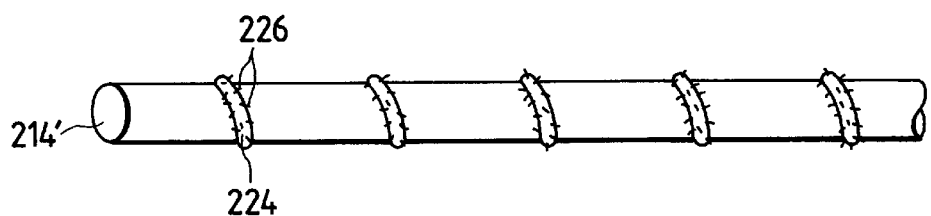
FIG. 19 is a view of still another example of a fishing line guide.

Moreover, as shown in FIG. 19, a separately formed fine fiber 224 including fluffy fibers 226 may be previously wound around the single fiber strip 214'.

Referring to the embodiments respectively shown in FIGS. 17 and 18, alternatively, the fluffy fibers 216 or thorn-like elements 216' may be formed on one side of the carbon bundle 214 or single fiber strip 214', that is, on the side thereof facing the rod pipe main body.

As can be clearly understood from the foregoing description, according to the invention, due to the fact that a connecting member including a component having a higher strength than synthetic resin which becomes fluid when heated is so arranged as to extend over both a rod pipe main body and fishing line guide, the connection of the fishing line guide with respect to the rod pipe main body is strengthened. This makes it possible to prevent the fishing line guide from peeling off from the rod pipe main body as well as to prevent the rod pipe from being broken or damaged.

Figure 20:
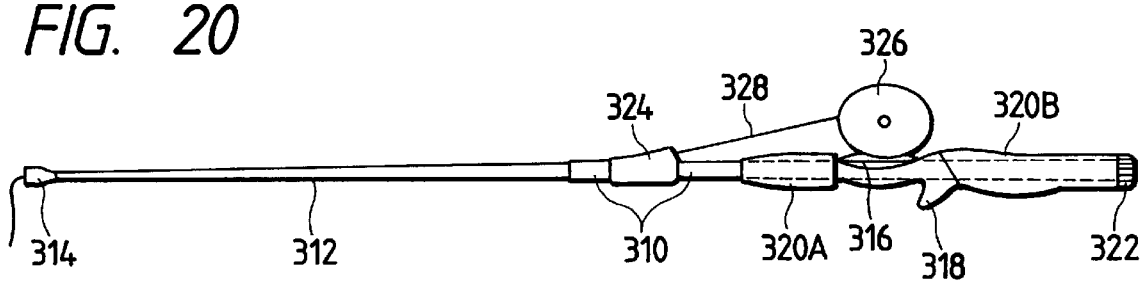
FIG. 20 is a side view of an eight embodiment of an inter-line fishing rod according to the invention.

FIG. 20 shows another embodiment of an inter-line fishing rod according to the invention. In this embodiment, high-strength fibers such as carbon fibers or the like are impregnated with thermosetting resin such as epoxy resin or the like or are mixed with thermoplastic resin such as polyamide or the like to thereby produce fiber reinforced prepreg (which is used in a wide sense including thermoplastic resin), and the thus produced fiber reinforced prepreg is then wound and fired to thereby form a rod pipe. That is, a base rod 310 and a top rod 312 are respectively formed of the thus formed rod pipe and, after they are formed, the base rod 310 and top rod 312 are connected to each other in an normal joining method. The base rod 310 includes a reel mounting portion 316 on which a double-bearing type reel 326 is mounted. Also, a fishing line 328 is inserted into the interior of the rod pipe through a fishing line introduction portion 324 provided in the front portion of the base rod 310 and is then guided outwardly from a top guide 314 formed in the leading end portion of the top rod 312.

Figure 21:
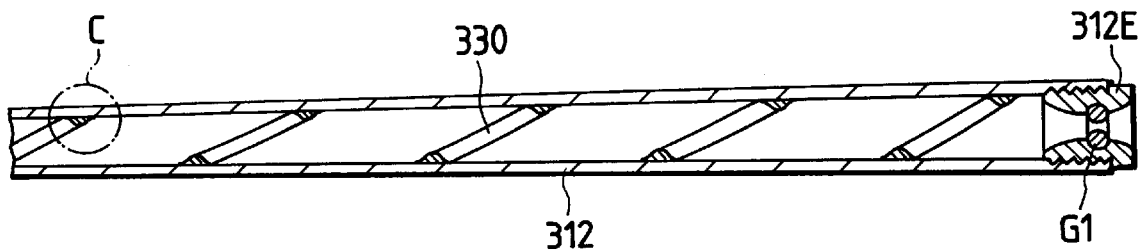
FIG. 21 is a longitudinal section view of the main portions of the embodiment shown in FIG. 20.
Figure 22:
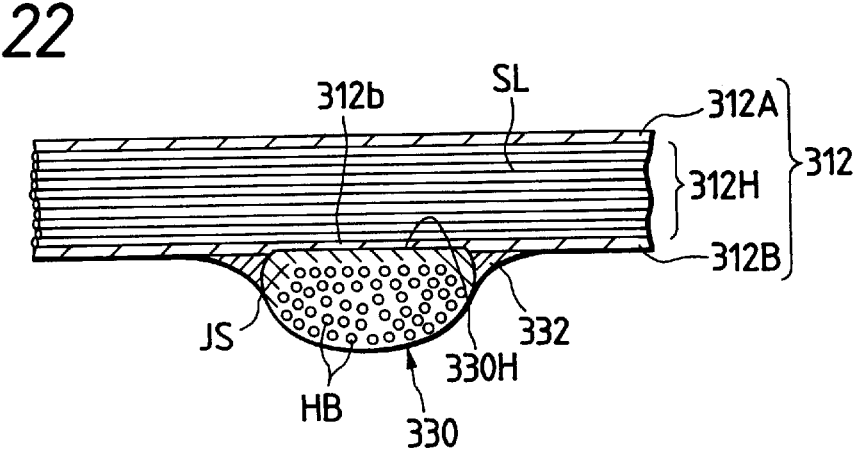
FIG. 22 is an enlarged view of a C portion shown in FIG. 21.

In FIG. 21, there is shown a longitudinal section view of the rear portion of the top rod 312 and, in FIG. 22, there is shown an enlarged view of a C portion shown in FIG. 21. A plug member 312E formed of metal or synthetic resin is threadedly engaged with the rear end of the top rod 312, while a guide ring G1 formed of ceramics is fixed to the inner periphery of the plug member 312E. On the other hand, a spirally shaped or wound guide element 330 is formed integral with the top rod or rod pipe 312 in such a manner that it extends along the rod pipe inner peripheral surface of the front side of the plug member 312E. In the illustrated embodiment, there is used the spirally wound guide element 330 but this is just an example. That is, instead of the spirally wound guide element 330, a plurality of individually formed annular guide elements may be provided at given intervals. Also, the guide element may be wound clockwise or counterclockwise, or both ways of winding can be used in combination. Further, the area of provision of the guide element may extend over the whole or part of the rod pipe 312.

The rod pipe 312 includes, on the outer and inner peripheral sides thereof, reinforcing layers 312A and 312B the fibers of which are respectively directed substantially in the circumferential direction of the rod pipe 312, and further includes between them a thick main body layer 312H the fibers of which are directed substantially in the axial direction of the rod pipe 312.

The guide element 330 includes synthetic resin as the matrix thereof and also includes reinforcing material HB such as ceramic fibers, glass fibers, metal fibers or the like which are mainly directed in the longitudinal direction of the guide element. Further, the guide element 330 includes an outer periphery 330H which is formed in a straight line, while the transverse section thereof is shown in FIG. 22. The reinforcing material HB is disposed mainly in the projecting area of the rod pipe 312 that can be contacted by the fishing line but is little disposed on the outer peripheral side of the rod pipe 312. On the other hand, the outer peripheral side of the rod pipe 312 as well as the portions thereof before and behind the projecting area are covered with a synthetic resin layer JS which consists mainly of synthetic resin.

The amount of resin contained in the area, in which the reinforcing material is disposed, is set for 30–60% by weight, that is, it is set rather larger than the percentage of the amount of resin contained in the rod pipe, in order not only to facilitate the formation of the synthetic resin layer JS but also to prevent a void from being produced on the inner peripheral surface of the guide element 330. Still further, before and behind the guide element 330, there are formed buffer portions 332 which are respectively formed of synthetic resin and are used to connect the guide element 330 with the inner surface of the rod pipe 312, while each of the buffer portions 332 is structured such that the thickness thereof decreases gradually as it is spaced apart from the guide element 330. Also, the guide element 330 is formed integral with the rod pipe in such a manner that the outer peripheral portion of the guide element 330 is slightly embedded in the reinforcing layer 312B. Therefore, the area 312b of the reinforcing layer 312B facing the outer periphery 330H of the guide element 330 is formed thinner than the remaining areas thereof.

The above-mentioned reinforcing layer area 312b, the areas of the reinforcing layer 312B existing in the periphery of the guide element 330, and the synthetic resin layer JS, generally, have a smaller modulus of bending elasticity than the projecting area in which the reinforcing material HB is disposed and thus they exert a buffer action together with the buffer portions 332, thereby being able to prevent generation of concentrated stresses in the rod pipe when the rod pipe is flexed. If the resin of the same system (if the rod pipe is formed of epoxy resin, then epoxy resin) used for the rod pipe 312 is used for the synthetic resin layer JS and the synthetic resin of buffer portions 332, then the strength of the integrally formed rod pipe and guide element can be enhanced.

Further, if the resin used for the guide element 330 is resin which will not melt at the heating temperature of the rod pipe when it is formed, for example, if it is thermoplastic resin, then because the outer periphery 330H of the guide element 330 is formed in a straight line as described before, when the guide element 330 is united with the prepreg for forming the rod pipe, reinforcing fibers SL which occupy the major part of the main body layer 312H and are directed in the axial direction of the rod pipe can be prevented from meandering, which results in the increased strength of the rod pipe.

In this manner, when compared with a structure in which no buffering areas (such as 332 or the like) are provided, and the outer periphery of the guide element is not linear but is formed in a curved surface projecting outwardly, the strength of the rod pipe according to the present embodiment when it is flexed is enhanced about 15–20%.

Figure 23:
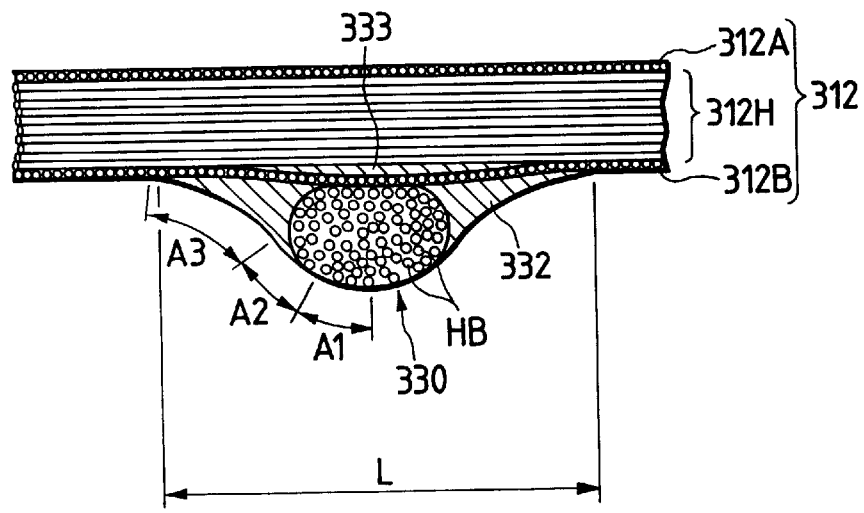
FIG. 23 is a longitudinal section view of another embodiment of the invention corresponding to FIG. 22.

Now, in FIG. 23, there is shown another embodiment of the invention in correspondence to FIG. 22. In the present embodiment, there is provided the projecting area A1 (although only the left half section thereof is shown in FIG. 23, of course, it also includes the right half section symmetrical to the left half section) of the guide element 330 to be contacted by the fishing line and, inside the projecting area A1 of the guide element 330, such reinforcing material HB as mentioned above is arranged and dispersed substantially uniformly, while the outer shape of the projecting area A1 is substantially elliptical. Areas A2 and A3 respectively situated before and behind the projecting area A1, that is, the remaining portions of the guide element 330 as well as the interior portions thereof provide buffer portions which are respectively formed of synthetic resin. The portions of the guide element 330 extending from the area A1 to the area A2 are projected inwardly to secure a certain degree of contact width with respect to the fishing line (the most part of the contact area of the guide element 330 is occupied by the area A1), while the area A3 is recessed inwardly so that the thickness of the guide element 330 decreases gradually. Preferably, the area A3 may be formed as a recessed curved surface having a gentler curvature than the average curvature of the areas A1 and A2 to thereby increase the width L of the guide element 330, so that the width L can be double the projecting area A1 (including both right and left half sections) or more. Further, in the present embodiment, there is formed a resin layer 333 which is situated outside the guide element 330 and provides a buffer layer between the main body layer 312H and reinforcing layer 312B. This can prevent generation of the concentrated stresses in the rod pipe when it is flexed.

According to a method for forming the above guide element 330 integral with the rod pipe, if a large number of reinforcing fibers are tied up in a bundle, are impregnated with thermosetting resin and are then twined, then the synthetic resin will melt to ooze out before and behind the guide element 330 when the reinforcing fibers are heated, thereby forming the buffer portions 332.

Figure 24:
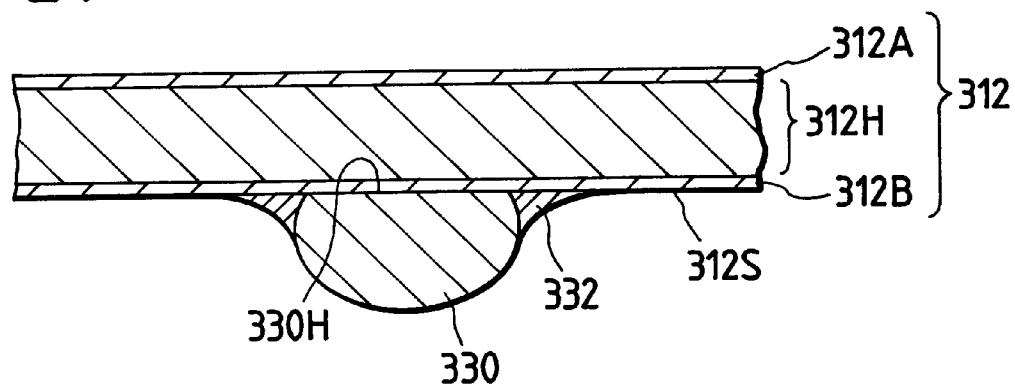
FIG. 24 is a longitudinal section view of still another embodiment of the invention corresponding to FIG. 22.

Now, referring to FIG. 24, the outer periphery 330H of the guide element 330 formed of material including a component which will not melt when heated, that is, ceramics material, metal material, heat resisting synthetic resin material, composite material or the like is formed as a straight line extending substantially along the inner peripheral surface 312S of the inside reinforcing layer 312B of the rod pipe 312, and, before and behind the guide element 330, there are formed buffer portions 332 which are respectively connected to the rod pipe and are used to exert a buffer action. Each of the buffer portions is formed of synthetic resin or by mixing reinforcing material into synthetic resin at a small rate. This structure can prevent generation of the centralized stresses in the rod pipe when the rod pipe is flexed. Also, since the outer periphery of the guide element 330 is formed in a straight line, it is possible to prevent the fibers of the main body layer 312H in the axial direction thereof from meandering, so that the strength of the rod pipe can be improved.

When the guide element 330 is formed of the above-mentioned heat resisting synthetic resin material, it is necessary to arrange such guide elements 330 at a large number of positions at short intervals in the axial direction of the rod pipe to thereby prevent the guide elements 330 from being worn strongly in part due to friction with respect to the fishing line.

Also, similarly as in other embodiments, the reinforcing layers 312A and 312B may be omitted and, in this case, normally, there may be mixed into the main body layer 312H a thin layer including fibers directed substantially in the circumferential direction or a cloth (including a scrim sheet) including the circumferential direction components of fibers.

Figure 25:
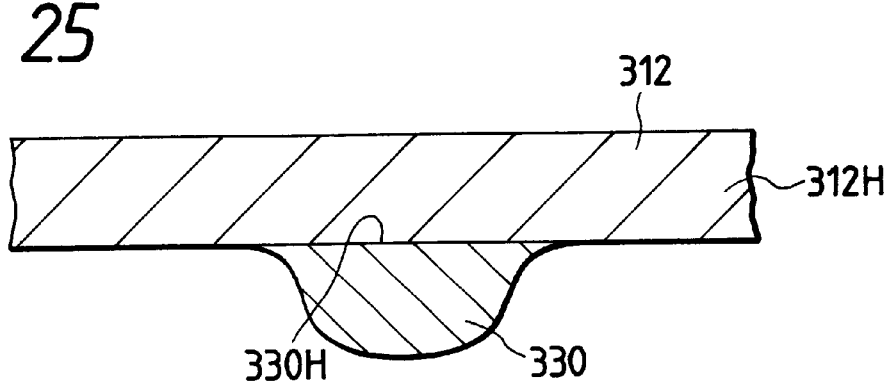
FIG. 25 is a longitudinal section view of yet another embodiment of the invention corresponding to FIG. 22.

Referring now to FIG. 25, the guide element 330 is formed of resin such as thermosetting resin or the like which melts at the forming or heating temperature of the rod pipe 312 comprising the main body layer 312H and, in this case, in order to prevent the fibers of the rod pipe in the axial direction thereof from meandering, it is preferable that the outer peripheral surface 330H of the guide element 330 is formed linearly. As described above, since the guide element 330 is easy to wear, a large number of such guide elements 330 are provided at their respective positions at short intervals (if the guide element 330 is a spirally wound guide element, then the distance between the respective spiral windings is set narrow). Also, because greater flexibility must be secured as the areas of the rod pipe are nearer to the top end thereof, it is preferable that such guide element formed of synthetic resin having low bending rigidity may be applied to the area near to the top end of the rod pipe. Due to the fact that the rod pipe is designed and structured such that such area can be flexed for escape if it is given a large load, the guide element applied to such area cannot be rubbed so strongly by the fishing line as it is applied to the area near to the fishing line introduction portion for the fishing line, so that even the guide element formed of synthetic resin is able to guide the fishing line smoothly. In this manner, the guide element 330 formed integral with the rod pipe 312 does not provide large resistance when the rod pipe is flexed, thereby preventing generation of the centralized stresses in the rod pipe. Also, wear resisting particles may be mixed into the synthetic resin of the guide element 330 to such a degree that they have no great influences on the bending rigidity of the synthetic resin. Further, the guide element 330 may be formed of the synthetic resin that is used to form the prepreg for the rod pipe 312.

Figure 26:
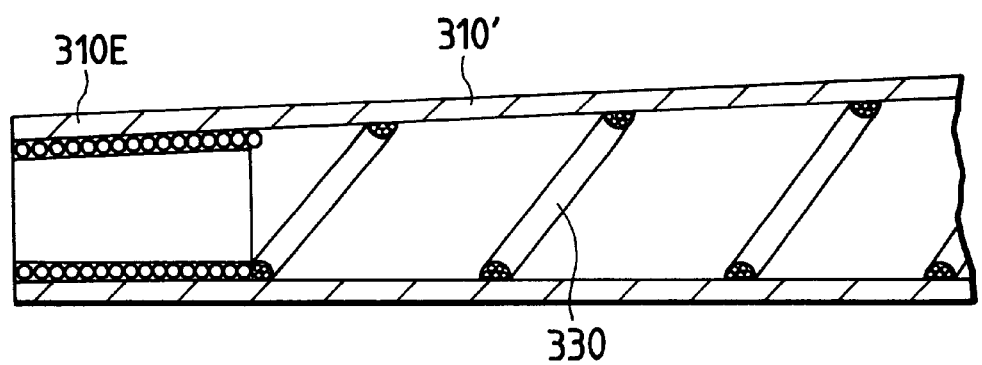
FIG. 26 is a partially longitudinal section view of an inter-line fishing rod according to the invention.

Referring now to FIG. 26, carbon fibers or the like are tied up into a bundle, the bundle is used to form a spirally wound guide element 330, and the guide element 330 is united with a rod pipe 310' in such a manner that it projects from the rod pipe 310'. In this embodiment, in particular, the terminal end portion of the guide element 330, as it is or with the fibers thereof loosened, is wound densely in a given range (such as a range to be used for joining or the like) of the front end portion of the rod pipe to thereby reinforce the front end portion of rod pipe. The inner surface of the densely wound portion may be tapered forwardly for a swing-out type fishing rod or may be made straight for a normal joining type fishing rod. In this manner, the end portion of the rod pipe that originally requires reinforcement, especially, the joining portion of the rod pipe can be reinforced by use of the spirally wound guide element, which in turn makes it possible to provide a high-strength rod pipe. Also, in some way to process the terminal end portion of the spirally shaped guide element 330, there is a possibility that the fishing line can be caught in such end portion, which increases the resistance of the fishing line or causes the guide element 330 to be damaged in such end portion or therefrom. However, if the terminal end portion of the guide element is processed according to the way shown in FIG. 26, then not only the above-mentioned catch of the fishing line can be prevented but also the durability of the guide element can be enhanced.

In contrast to FIG. 26, when the spirally shaped guide element 330 is terminated at a further backward position of the rod pipe 310', in the portion of the guide element 330 situated upstream of this terminal end position, the fibers of the guide element 330 are loosened and are densely wound around the rod pipe up to an intermediate position which does not reach the leading end of the rod pipe, while the thickness of the guide element decreases gradually at least in the neighborhood of the terminal end of such densely wound portion. In this structure as well, the rod pipe 310' can be reinforced with respect to the concentrated stresses to be generated in the neighborhood of the terminal end position of the spirally shaped guide element 330, thereby being able to prevent the rod pipe against breakage.

Here, such reinforcement, of course, can be attained by use of other kinds of prepreg sheets, tape or other similar members, or such reinforcement can be combined with the latter.

Figure 27:
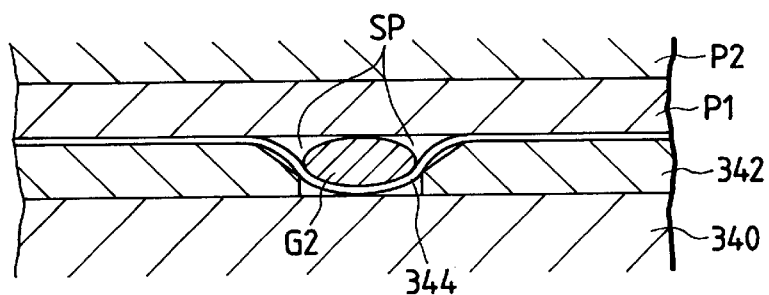
FIG. 27 is a partially longitudinal section view of an example of a method for manufacturing an inter-line fishing rod according to the invention.

Now, FIG. 27 is an explanatory view of a method for manufacturing an inter-line fishing rod according to the invention. In FIG. 27, a sheet of tape 342 having a given thickness is wound around the surface of a core metal 340 with the spiral windings thereof spaced at a given distance, a thin film 344 formed of polyethylene naphtalate (PEN), polyethylene terephtalate (PET) or the like which can stand a heating temperature is coated on the above wound assembly, and a spirally shaped guide element G2 is wound around the tape winding spaces. In this case, if the thickness of the tape 342 is previously set for a value almost equal to the height of the guide element G2, then the lower surface of prepreg 1, which is used to form a rod pipe and is wound from above, can be substantially contacted with the outer periphery of the guide element G2.

After then, if the thus obtained assembly is heated under pressure, then the synthetic resin of the prepreg P1 and P2 is allowed to flow into a space SP to thereby form a buffer portion. When the synthetic resin flows into the space SP, in a normal method, there are produced burrs before and behind the guide element G2 between the windings of the tape 342 but, on the other hand, according to the present method, the provision of the thin film 344 prevents the production of such burrs. When such film 344 is not used, the guide element G2 is wound around in such a manner that it is in pressure contact with the edges of the tape 342 existing on the two sides of the guide element G2, thereby being able to prevent the production of the burrs. Even when the film 344 is used, from the standpoint of burr prevention, it is preferable that the guide element is formed while it is pressure contacted by the tape 342 from the two sides thereof.

Besides the above methods, the guide element can also be formed by use of the forming material of the rod pipe. That is, when such reinforcing layer 312B on the inner peripheral side of the rod pipe as shown in FIG. 22 is formed in the rod pipe, the reinforcing layer 312B is not formed in a sheet-shaped prepreg layer but in a tape-shaped prepreg layer smaller in width than the sheet-shaped prepreg layer. The core metal is previously coated with a tube, which is formed of silicone or the like and includes on the outer periphery thereof a spirally extending groove or a plurality of independent annular grooves so that projecting strips can be formed on the inner surface of the rod pipe, or heat resisting resin tape is previously wound around the core metal in the form of a spiral strip or the like. After then, if the above-mentioned tape-shaped prepreg is wound around from above the tube or tape, then the projecting strips for the guide element can be formed together and integrally with the reinforcing layer 312B of the inner periphery of the rod pipe. After such integral formation, the united assembly is fired according to a conventionally normal method and, finally, the tube or resin tape is removed from the assembly. According to the above-mentioned method, not only the guide element can be formed simply and easily but also, in the case of the tape-shaped prepreg, the reinforcing fibers can be arranged very long and substantially continuously along the longitudinal direction of the tape. Therefore, in the thus formed guide element, the reinforcing fibers thereof corresponding to the above-mentioned reinforcing material are arranged to extend substantially continuously, which results in a high-strength guide element.

If material having a smaller modulus of longitudinal elasticity than the material of the rod pipe main body layer in the base portion and intermediate portion of the fishing rod is used in the rod pipe main body layer in the top portion of the fishing rod such as the top rod and the like, the bending rigidity of the rod top portion can be decreased accordingly. Generally, in the fishing rod with an inserted fishing line, the inside diameter of the rod top portion cannot be decreased so much in consideration of the outside diameter of the fishing line to be inserted through the fishing rod. However, even in such fishing rod with an inserted fishing line, use of the material having a smaller modulus of longitudinal elasticity can provide a sufficiently soft rod top portion.

Figure 28:
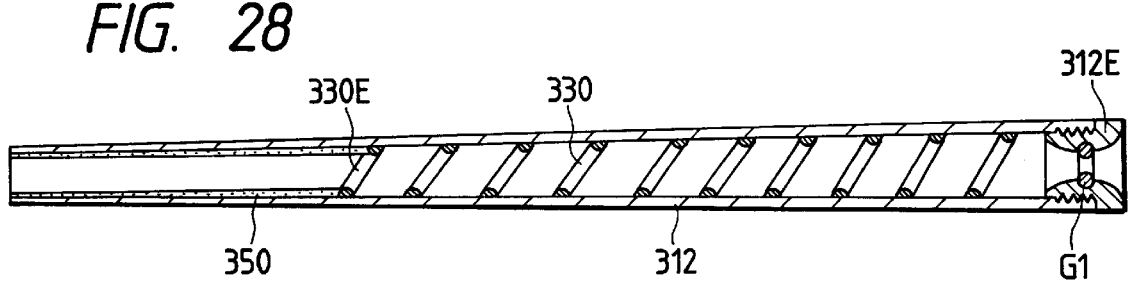
FIG. 28 is a longitudinal section view of another embodiment of an inter-line fishing rod according to the invention.

Now, FIG. 28 shows another embodiment of the present invention. FIG. 28 is a longitudinal section view of the top rod 312 shown in FIG. 20. In the present embodiment, the spirally shaped guide element 330 is so formed as to extend forwardly from the rear end portion of the rod pipe 312 to the intermediate position of the rod pipe 312. Also, from the terminated portion 330E of the guide element 330 to the leading end of the rod pipe 312, there is provided a reinforcing layer 350 in such a manner that it is integrally united with the main body of the rod pipe 312. The reinforcing layer 350 has a thickness substantially equal to the height of the guide element 330 in the neighborhood of the terminated portion 330E of the guide element 330, while it decreases in thickness as it goes forwardly. However, when soft material is used as the material of the reinforcing layer 350, the reinforcing layer 350 may be so formed as to increase in thickness as it goes forwardly and also the rod pipe main body 312 may be so formed as to decrease in thickness, thereby adjusting the degree of flexing of the rod pipe. The thickness of the reinforcing layer 350 in the neighborhood of the terminated portion 330E may be preferably almost equal to the height of the guide element 330 and, in particular, the thickness of the reinforcing layer 350 may be set to a value which is about 85–105% of the guide element height. The material of the reinforcing layer preferably includes synthetic resin, material having a high content of synthetic resin such as prepreg including 50% or more of synthetic resin by weight, while it also includes material having high rigidity from the viewpoint of the reinforcing action.

The material of the spirally shaped guide element 330 includes a bundle of carbon fibers, glass fibers, metal fibers, ceramics fibers or the like, other shapes of fiber reinforced resin prepreg, organic material such as organic fibers or the like, material mixed with particles or short fibers as reinforcing material, material mixed with hollow fibers or hollow particles for weight reduction, and material mixed with globular particles for improvement in damage resistance and wear resistance. This also applies in the other embodiments of the invention.

Figure 29:
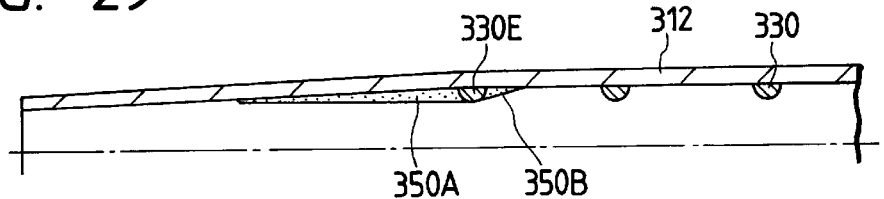
FIG. 29 is a partially longitudinal section view of a modification of the embodiment shown in FIG. 28.

Now, FIG. 29 shows a modification of the embodiment shown in FIG. 28. In the present modification, a reinforcing layer 350A is so formed as to decrease gradually in thickness from the terminated portion 330E of the guide element 330 forwardly up to an intermediate position of the top rod 312 and, backwardly of the terminated portion 330E as well, there is provided a reinforcing layer 350B which extends for a certain length and increases gradually in thickness. That is, the thus reinforced area of the top rod 312 is increased in thickness over the remaining areas thereof. This not only reinforces the area of the rod pipe 312 in the neighborhood of the guide element terminated portion to thereby increase the strength of the rod pipe 312 but also, when forming a rod pipe including the projecting guide element 330 united integrally therewith, exerts an action to fill up a level difference between the core metal and main body prepreg in the neighborhood of the guide element terminated portion in order to prevent the main body prepreg from meandering.

Also, while the spirally shaped guide element is terminated at the intermediate position of the rod pipe as shown in FIG. 26, in a structure in which the guide element is wound continuously and densely, as described above, such termination of the guide element can exert a similar action to the reinforcing layer in FIG. 28 and in other figures.

In the above-mentioned description, there is shown an embodiment in which a spirally shaped guide is used as a guide element. Similarly, in an embodiment in which there are used a large number of annular guides spaced apart from one another, the above-mentioned reinforcing means can also be applied to the terminated portion of the annular guide element group. Also, even when the spirally shaped guide or the annular guide group is terminated at the backwardly intermediate position of the rod pipe, the above reinforcing means can be similarly applied to the terminated portion thereof.

Figure 30:
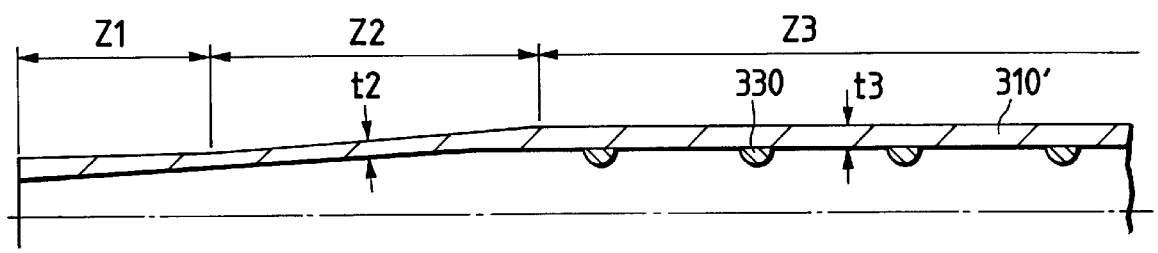
FIG. 30 is a partially longitudinal section view of another embodiment of an inter-line fishing rod according to the invention.

Now, in FIG. 30, there is shown another embodiment of an inter-line fishing rod according to the invention. In the present embodiment, when the guide element 330 is formed integral with the rod pipe 310' in such a manner that it projects from the rod pipe 310', in order to prevent the possibility that stresses can be concentrated in the rod pipe to thereby lower the flexural strength of the rod pipe, the thickness t3 of an area Z3 of the rod pipe in which the guide element 330 is provided is set larger than the thickness t2 of an area Z2 of the rod pipe in which the guide element 330 is not provided, thereby improving the flexural strength of the rod pipe. Here, an area Z1 is a joining area which is formed thick for reinforcing the strength thereof because the area Z1 is used as a joining portion for joining a top rod or the like which is arranged forwardly of the rod pipe.

Apart from the above reason why the area Z1 is formed thick, another rod pipe having a small diameter and arranged forwardly of the area Z1 is joined with the area Z1 and the fishing line is inserted into the small diameter hole of the rear end portion of the small-diameter rod pipe. As a result of this, in the area adjacent to the small-diameter rod pipe rear end portion, the insertion range of the fishing line is narrow. This prevents the fishing line from touching the rod pipe inner surface of the area Z2 between the small-diameter rod pipe rear end portion and the area Z3. That is, the above area Z2 is an area in which the guide element 330 is not required and, in order to avoid generation of the concentrated stresses in the rod pipe and to prevent the worsened flexibility of the rod pipe, it is preferable that the guide element is not provided in the area Z2 where any guide element need not be provided. If such area Z2 can be secured for a long range, then the taper of the area Z2, along which the diameter of the rod pipe decreases from the area Z3 to the joining area Z1, can be set small, so that variations in the rigidity of the rod pipe can be preferably made gentle. To space the area Z1 having a large thickness and having high rigidity apart from the area Z3 increased in rigidity due to existence of the guide element as well as to interpose the area Z2 having low rigidity between them is helpful in varying smoothly the flexibility of the whole fishing rod consisting of a plurality of rod pipes joined together. The length of the area Z2 may be set for 30–50 mm or more, preferably, on the order of 100 mm.

Figure 31:
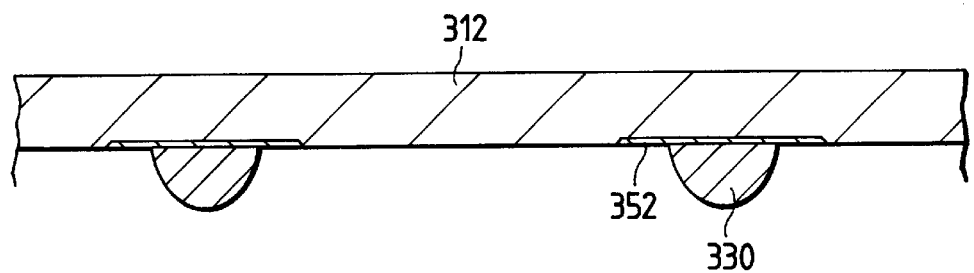
FIG. 31 is a partially longitudinal section view of still another embodiment of an inter-line fishing rod according to the invention.

Now, FIG. 31 is an explanatory view of another embodiment of the present invention. In the present embodiment, between the main body of the rod pipe 312 and guide element 330, there is interposed integrally therewith a reinforcing member 352 having a larger width than the width of the guide element 330. The reinforcing member 352, which extends over the whole of the guide element 330 in the width direction thereof as well as before and behind the guide element 330, is a sheet-shaped member which is formed of fiber reinforced prepreg such as a glass fiber scrim cloth sheet or the like, a carbon tape, a synthetic resin film, paper, or the like. However, the reinforcing member 352 is not limited to the sheet-shaped member but it may be stringy synthetic resin, cotton yarns or the like. In this manner, the rod pipe is reinforced against the concentrated stresses in the guide element peripheral portion of the rod pipe caused by the integral formation of the guide element with the rod pipe, thereby improving the flexural strength of the rod pipe.

Figure 32:
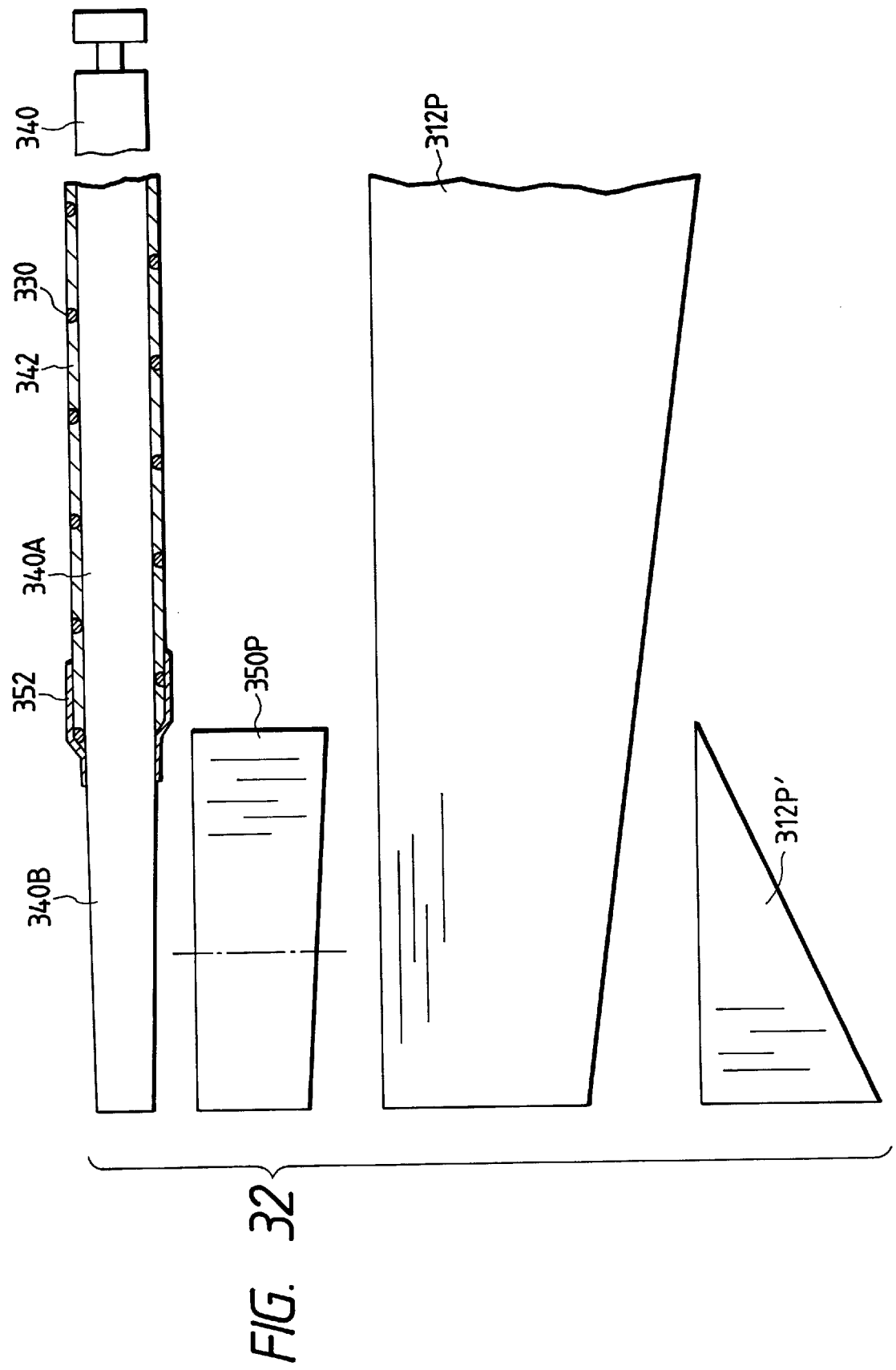
FIG. 32 is an explanatory view of a method for manufacturing an inter-line fishing rod according to the invention.

Now, FIG. 32 is an explanatory view of a method for forming a rod pipe with a guide element including a reinforcing layer according to the invention. On the straight-shaped or gently tapered portion 340A of a core metal 340 except for the front tapered portion 340B thereof, a heat resistant tape 342 having a suitable thickness almost equal to the height of the guide element 330, the guide element 330, and a film (344, not shown) are windingly disposed in such a manner as described in FIG. 8, the reinforcing member 352 described above in connection with the above FIG. 12 is wound around the terminated portion of the guide element 330, and further a prepreg 350P for reinforcement, a prepreg 312P for forming a rod pipe main body, and a prepreg 312P' for reinforcing the joining portion of the rod pipe are respectively wound around the core metal 340.

The reinforcing prepreg 350P is a rectangular prepreg which is wound around the core metal 340 in a range extending from the terminated portion of the guide element 330 to the portion of the core metal 340 existing forwardly of the guide element 330, and the reinforcing prepreg 350P corresponds to the reinforcing layer 350 shown in FIG. 18. The Joining portion reinforcing prepreg 312P' is formed in a triangular shape and, in this case, it is extended to a length which allows the leading end of the triangle to reach the terminated portion of the guide element. Therefore, the portion of the rod pipe in the neighborhood of the terminated portion of the guide element can also be reinforced but it is not always necessary to extend the prepreg 312P' to the guide element terminated portion. Also, the main body prepreg 12P need not be always formed of a single sheet of prepreg. For example, for this purpose, generally, a plurality of rectangular shaped or triangularly shaped prepregs may be wound around to thereby form a rod pipe which becomes softer toward the leading end portion thereof, or reinforced fibers directed in the axial direction of the fishing rod may be used as a matrix and the inside and outside of the reinforced fibers may be held by and between reinforced fibers directed in the circumferential direction of the fishing rod.

The reinforcing member 352 shown in FIG. 32 is not necessary in forming the reinforcing structure shown in FIG. 28, and also the reinforcing prepreg 350P may be made shorter by omitting the left side portion thereof drawn on the left side of a one-dot chained line shown in FIG. 32 and, as shown in FIG. 29, the reinforcing layer 350A may be provided up to the intermediate position of the rod pipe. Further, it is also possible to employ the structure shown in FIG. 29 as it is in which another reinforcing layer 50B is additionally provided. In addition, the reinforcing prepreg 350P is not necessary in forming the reinforcing structure shown in FIG. 31 but, as illustrated in the present manufacturing method, of course, it is also possible to use both of them in combination.

As can be clearly understood from the foregoing description, according to the invention, it is possible to provide a fishing rod with an inserted fishing line which prevents the guide element provision portion of a rod pipe including a guide element formed integrally with and projecting inwardly from the inside of the rod pipe from being lowered in strength.

What is claimed is:

1. A inter-line fishing rod including a joint portion coaxially joining a top rod and a base rod, wherein a spirally shaped fishing line guide is disposed in the interior of said top rod situated outside said joint portion, a terminal portion of said spirally shaped fishing line guide exists proximate said joint portion, and a fishing line guide ring having a smaller inside diameter than an inside diameter of the portion of said spirally shaped fishing line guide existing proximate said terminal portion thereof is disposed within said joint portion adjacent an end portion of said base rod, said base rod portion further including a fishline introduction portion disposed intermediate along a length thereof and a reel seat provided on a rear portion thereof.

2. An interline fishing rod comprising:
   a unitary base rod pipe formed of fiber reinforced prepreg, said base rod pipe having a front portion and a rear portion, said base rod pipe having a means to mount a reel on said rear portion and a fishing line introduction hole provided between said front portion and said rear portion;
   a fishing line guide ring formed of a material harder than said rod base pipe disposed within an annular recess formed at a terminal end of said front portion of said base rod pipe and extending radially inward defining an inner diameter smaller than an inner diameter of said rod base pipe adjacent to said fishing line guide ring;
   a unitary top rod pipe coaxially joined to said front portion of said base rod pipe and extending longitudinally away from said base rod pipe to a leading end thereof, said top rod pipe having a rear joint portion disposed about and coextensive with said front portion of said base rod pipe, said rear joint portion of said top pipe having an inner diameter substantially equal to an outer diameter of said front portion of said base rod pipe; and
   a spirally shaped fishing line guide disposed on an inner surface of said top rod pipe terminating at an end portion adjacent to said fishing line guide ring, wherein
   said inner diameter of said fishing line guide ring is smaller than an inside diameter of said spirally shaped fishing guide adjacent to said end portion thereof.

3. An interline fishing rod comprising:
   a hollow unitary base rod pipe formed of a fiber reinforced prepreg having carbon reinforcing fibers, said base rod pipe having a fishing line introduction portion provided in a front portion thereof and a means to mount a reel on a rear portion thereof;
   a fishing line guide ring formed of a material harder than said base rod pipe disposed within an annular recessed portion formed in an inner peripheral surface of said hollow unitary base rod pipe adjacent a front end portion thereof, said fishing line guide ring extending radially inward defining an inner diameter smaller than an inner diameter of said unitary base rod pipe;
   a top rod pipe coaxially joined to and longitudinally extending away from said front portion of said base rod pipe, said top rod pipe having a spirally shaped fishing line guide disposed on an inner surface of said top rod pipe terminating at an end portion adjacent to said base rod pipe,
   wherein said inner diameter of said fishing line guide ring is smaller than an inside diameter of said spirally shaped fishing line guide adjacent said end portion thereof.

4. The interline fishing rod according to claim 2, wherein said front end portion of said base rod pipe is disposed within said coextensive with said top rod pipe.

* * * * *